United States Patent
Hu

(10) Patent No.: US 12,532,017 B2
(45) Date of Patent: Jan. 20, 2026

(54) FILE ENCAPSULATION METHOD, FILE TRANSMISSION METHOD, FILE DECODING METHOD, ELECTRONIC DEVICE, AND STORAGE MEDIUM

(71) Applicant: Tencent Technology (Shenzhen) Company Limited, Guangdong (CN)

(72) Inventor: Ying Hu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 542 days.

(21) Appl. No.: 17/951,821

(22) Filed: Sep. 23, 2022

(65) Prior Publication Data

US 2023/0017002 A1    Jan. 19, 2023

Related U.S. Application Data

(63) Continuation of application No. PCT/CN2021/115528, filed on Aug. 31, 2021.

(30) Foreign Application Priority Data

Oct. 16, 2020  (CN) .......................... 202011111925.5

(51) Int. Cl.
   *H04N 19/82*   (2014.01)
   *H04N 19/31*   (2014.01)
   *H04N 19/46*   (2014.01)

(52) U.S. Cl.
   CPC ............ *H04N 19/46* (2014.11); *H04N 19/31* (2014.11)

(58) Field of Classification Search
   CPC .............................. H04N 19/46; H04N 19/31
   See application file for complete search history.

(56) References Cited

U.S. PATENT DOCUMENTS

| | | | |
|---|---|---|---|
| 2009/0003439 A1* | 1/2009 | Wang | H04N 19/31 375/E7.199 |
| 2012/0057631 A1* | 3/2012 | Le Leannec | H04N 19/33 375/E7.026 |

(Continued)

FOREIGN PATENT DOCUMENTS

| | | |
|---|---|---|
| CN | 101120593 A | 2/2008 |
| CN | 101690229 A | 3/2010 |

(Continued)

OTHER PUBLICATIONS

Chinese Office Action of No. 202011111925.5 dated Jul. 14, 2021.

(Continued)

*Primary Examiner* — Patrick E Demosky
(74) *Attorney, Agent, or Firm* — Sughrue Mion, PLLC

(57) ABSTRACT

A file encapsulation method and apparatus, a file transmission method and apparatus, a file decoding method and apparatus, an electronic device, and a storage medium. The file encapsulation method includes: obtaining an encoded target video and temporal layer information of samples determined during encoding of the target video, encapsulating the encoded target video according to the temporal layer information of the samples to generate a first encapsulated file, the first encapsulated file including the temporal layer information of the samples, and transmitting the first encapsulated file to a first device.

19 Claims, 8 Drawing Sheets

(56) References Cited

U.S. PATENT DOCUMENTS

| | | |
|---|---|---|
| 2014/0098860 A1 | 4/2014 | Wang |
| 2016/0373771 A1 | 12/2016 | Hendry et al. |
| 2017/0111642 A1 | 4/2017 | Hendry et al. |
| 2023/0336761 A1* | 10/2023 | Hendry ................ H04N 19/132 |

FOREIGN PATENT DOCUMENTS

| | | |
|---|---|---|
| CN | 104185995 A | 12/2014 |
| CN | 104704829 A | 6/2015 |
| CN | 105519119 A | 4/2016 |
| CN | 111263160 A | 6/2020 |
| CN | 112565815 A | 3/2021 |

OTHER PUBLICATIONS

International Search Report of PCT/CN2021/115528 dated Sep. 27, 2021 [PCT/ISA/210].
Written Opinion of PCT/CN2021/115528 dated Sep. 27, 2021 [PCT/ISA/237].
Extended European Search Report dated Jul. 13, 2023 in Application No. 21879136.6.

* cited by examiner

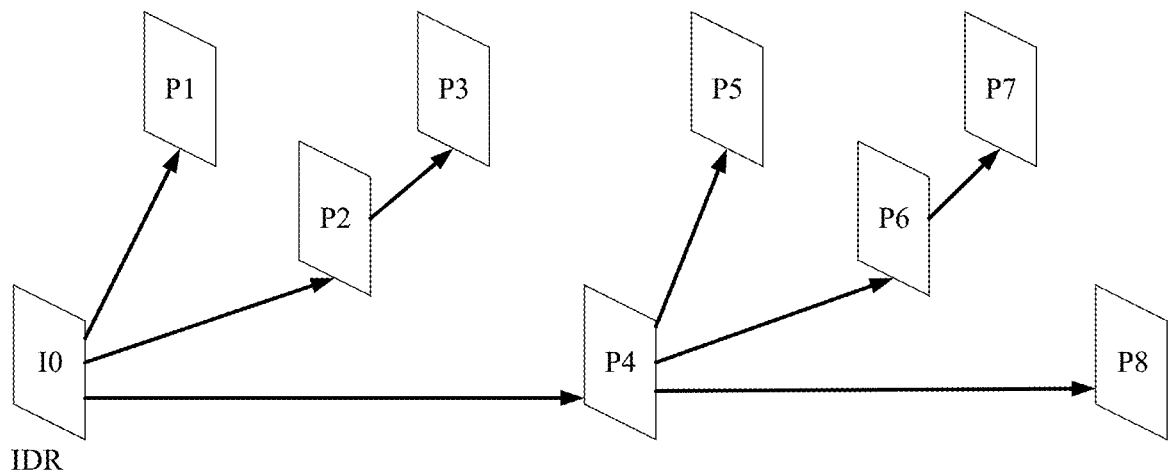

FIG. 7

| Receive a first encapsulated file, the first encapsulated file being generated by encapsulating an encoded target video according to temporal layer information of samples of the target video, the target video including the samples, the temporal layer information being determined during encoding of the target video, and the first encapsulated file including the temporal layer information of the samples | S810 |

| Determine a to-be-transmitted sample in the target video according to the temporal layer information of the samples in the first encapsulated file | S820 |

| Transmit the to-be-transmitted sample in the target video to a second device | S830 |

FIG. 8

FILE ENCAPSULATION METHOD, FILE TRANSMISSION METHOD, FILE DECODING METHOD, ELECTRONIC DEVICE, AND STORAGE MEDIUM

CROSS-REFERENCE RELATED APPLICATION(S)

This application is a continuation application of International Application No. PCT/CN2021/115528, filed on Aug. 31, 2021, which claims priority to Chinese Patent Application No. 202011111925.5, filed with the China National Intellectual Property Administration on Oct. 16, 2020, the disclosures of which are incorporated by reference in their entireties.

FIELD

The present disclosure relates to the field of video encapsulation technologies, and specifically, to a file encapsulation method, a file transmission method, a file decoding method, a file encapsulation apparatus, a file transmission apparatus, a file decoding apparatus, an electronic device, and a computer-readable storage medium.

BACKGROUND

A complete video processing process may include video acquisition, video encoding, video file encapsulation, video file transmission, video file decapsulation, video decoding, and final video presentation.

It can be learned that after a video file is encoded, an encoded data stream needs to be encapsulated and transmitted to a user. A user terminal needs to perform inverse operations such as decapsulation and decoding to finally present video content.

Generation of video file content may include a real scene acquired by a camera and a screen content scene generated by a computer in terms of a signal obtaining manner. Due to different statistical characteristics, corresponding compression encoding methods may also be different. The video file may be compressed by using a standard compression algorithm such as VVC and HEVC or some specific compression algorithms designed for the content.

The information disclosed in the above background part is used only for enhancing the understanding of the background of the present disclosure.

SUMMARY

Embodiments of the present disclosure provide a file encapsulation method, a file transmission method, a file decoding method, a file encapsulation apparatus, a file transmission apparatus, a file decoding apparatus, an electronic device, and a computer-readable storage medium, which can indicate corresponding temporal layer information during file encapsulation.

Other characteristics and advantages of the present disclosure become apparent from the following detailed description, or may be learned in part through the practice of the present disclosure.

Some embodiments provide a file encapsulation method, the method including: obtaining an encoded target video and temporal layer information of samples determined during encoding of a target video, the target video including the samples; encapsulating the encoded target video according to the temporal layer information of the samples, to generate a first encapsulated file, the first encapsulated file including the temporal layer information of the samples; and transmitting the first encapsulated file to a first device.

Some embodiments provide a file transmission method, the method including: receiving a first encapsulated file, the first encapsulated file being generated by encapsulating an encoded target video according to temporal layer information of samples of a target video, the target video including the samples, the temporal layer information being determined during encoding of the target video, and the first encapsulated file including the temporal layer information of the samples; determining a to-be-transmitted sample in the target video according to the temporal layer information of the samples in the first encapsulated file; and transmitting the to-be-transmitted sample in the target video to a second device.

Some embodiments provide a file decoding method, the method including: receiving a target encapsulated file transmitted by a first device, the target encapsulated file being generated by encapsulating at least some samples in an encoded target video according to temporal layer information of samples in a target video, the temporal layer information being determined during encoding of the target video, and the target encapsulated file including temporal layer information of the at least some samples; determining a to-be-decoded sample in the target video according to the temporal layer information of the at least some samples in the target encapsulated file; and decoding the to-be-decoded sample in a second device.

Some embodiments provide a file encapsulation apparatus, the apparatus including: at least one memory configured to store program code; and at least one processor configured to read the program code and operate as instructed by the program code, the program code comprising: a temporal layer information obtaining unit, configured to obtain an encoded target video and temporal layer information of samples determined during encoding of a target video, the target video including the samples; a first encapsulated file generation unit, configured to encapsulate the encoded target video according to the temporal layer information of the samples, to generate a first encapsulated file, the first encapsulated file including the temporal layer information of the samples; and a first encapsulated file transmitting unit, configured to transmit the first encapsulated file to a first device.

Some embodiments provide a file transmission apparatus, including: at least one memory configured to store program code; and at least one processor configured to read the program code and operate as instructed by the program code, the program code comprising: a first encapsulated file receiving unit, configured to receive a first encapsulated file, the first encapsulated file being generated by encapsulating an encoded target video according to temporal layer information of samples of a target video, the target video including the samples, the temporal layer information being determined during encoding of the target video, and the first encapsulated file including the temporal layer information of the samples; a to-be-transmitted sample determining unit, configured to determine a to-be-transmitted sample in the target video according to the temporal layer information of the samples in the first encapsulated file; and a to-be-transmitted sample transmitting unit, configured to transmit the to-be-transmitted sample in the target video to a second device.

Some embodiments provide a file decoding apparatus, including: at least one memory configured to store program code; and at least one processor configured to read the program code and operate as instructed by the program code, the program code comprising: a target encapsulated file receiving unit, configured to receive a target encapsulated file transmitted by a first device, the target encapsulated file being generated by encapsulating at least some samples in an encoded target video according to temporal layer information of samples in a target video, the temporal layer information being determined during encoding of the target video, and the target encapsulated file including temporal layer information of the at least some samples; a to-be-decoded sample determining unit, configured to determine a to-be-decoded sample in the target video according to the temporal layer information of the at least some samples in the target encapsulated file; and a to-be-decoded sample decoding unit, configured to decode the to-be-decoded sample in a second device.

Some embodiments provide a non-transitory computer-readable storage medium, storing computer code that when executed by at least one processor causes the at least one processor to implement the file encapsulation method or the file transmission method or the file decoding method according to the above embodiments.

Some embodiments provide an electronic device, including: at least one processor; and a storage apparatus, configured to store at least one program, the at least one program, when executed by the at least one processor, causing the at least one processor to implement the file encapsulation method or the file transmission method or the file decoding method according to the above embodiments.

It is to be understood that the above general descriptions and the following detailed descriptions are merely for exemplary and explanatory purposes, and cannot limit the present disclosure.

BRIEF DESCRIPTION OF THE DRAWINGS

The accompanying drawings herein, which are incorporated in the specification as a part of the specification, show embodiments in accordance with the present disclosure, and together with the specification are used to explain the principle of the present disclosure. Apparently, the accompanying drawings in the following description show merely some embodiments of the present disclosure, and a person of ordinary skill in the art may still derive other drawings from these accompanying drawings without creative efforts. In the accompanying drawings:

FIG. 7 schematically shows a schematic diagram of an independent switching point sample according to some embodiments.

FIG. 8 schematically shows a flowchart of a file transmission method according to some embodiments.

DESCRIPTION OF EMBODIMENTS

Figure 1:
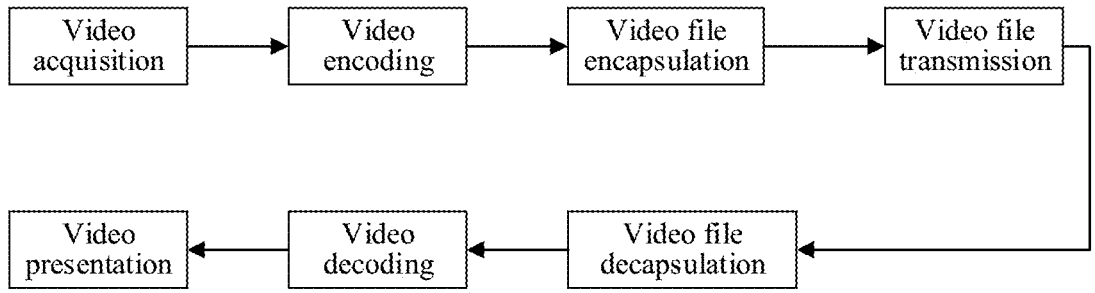
FIG. 1 schematically shows a schematic diagram of a video processing process according to some embodiments.

The exemplary implementations are now described comprehensively with reference to the accompanying drawings. However, the examples of implementations may be implemented in multiple forms, and it is not to be understood as being limited to the examples of implementations described herein. Conversely, the implementations are provided to make the present disclosure more comprehensive and complete, and comprehensively convey the idea of the examples of the implementations to a person skilled in the art.

In addition, the described features, structures, or characteristics may be combined in one or more embodiments in any appropriate manner. In the following descriptions, many specific details are provided to obtain a thorough understanding of the embodiments of the present disclosure. However, a person skilled in the art is to be aware of that, the technical solutions in the disclosure may be implemented without one or more of the particular details, or other methods, unit, apparatus, or operation may be adopted. In other cases, well-known methods, apparatuses, implementations, or operations are not shown or described in detail to avoid obscuring aspects of the present disclosure.

Although some video encoding technologies support a temporal layer division technology, the video encoding technologies indicate information such as a layer number and a maximum quantity of layers of an image frame only in an encoded bitstream.

On one hand, a network device needs to decode the encoded bitstream to obtain temporal layer information indicated in the encoded bitstream. Considering operation complexity of video decoding, a large amount of computing resources needs to be occupied. On the other hand, actually, a plurality of network devices do not support implementation of a decoding algorithm, causing the network devices to be unable to obtain the temporal layer information in the encoded bitstream.

Therefore, a new file encapsulation method, file transmission method, file decoding method, file encapsulation apparatus, file transmission apparatus, file decoding apparatus, an electronic device, and a computer-readable storage medium are required.

In the technical solution provided in some embodiments, temporal layer information corresponding to a target video is indicated in a first encapsulated file of the target video, on one hand, a first device and a second device for video transmission and consumption can more conveniently obtain the temporal layer information during network transmission and consumption without decoding an encoded bitstream of the target video, to save a large amount of computing resources. On the other hand, the first device and the second device can also obtain the temporal layer information of the target video in time even without an implementation capability of a decoding algorithm, so as to better guide transmission and decoding processes of the target video.

The block diagrams shown in the accompanying drawings are merely functional entities and do not necessarily correspond to physically independent entities. To be specific, such functional entities may be implemented in the form of software, or implemented in at least one hardware module or integrated circuit, or implemented in different networks and/or processor apparatuses and/or microcontroller apparatuses.

The flowcharts shown in the accompanying drawings are merely exemplary descriptions and do not necessarily include all of the content and operations/steps, nor are the flowcharts necessarily performed in the order described. For example, some operations/steps may be further divided, while some operations/steps may be combined or partially combined. Therefore, an actual execution order may change according to an actual case.

First, some terms used in the embodiments of the present disclosure are introduced.

AVS: audio video coding standard.

AVS3: a 3rd generation audio video coding standard launched by an AVS standard group.

HEVC: high efficiency video coding, or referred to as H.265.

VVC: versatile video coding, or referred to as H.266.

Intra (picture) prediction.

Inter (picture) prediction.

SCC: screen content coding.

Loop filtering.

QP: a quantization parameter.

LCU: largest coding unit.

CTU: coding tree unit, which is generally divided downward from the largest coding unit.

CU: coding unit.

PU: prediction unit.

MV: motion vector.

MVP: motion vector prediction.

MVD: motion vector difference, a difference between MVP and a real estimated value of MV.

AMVP: advanced motion vector prediction.

ME: motion estimation, a process of obtaining an MV is referred to as motion estimation, which is a technology in motion compensation (MC).

MC is a process of obtaining an estimated value of a current image according to the MV and an inter prediction method. Motion compensation is a method for describing a difference between adjacent frames (being adjacent represents being adjacent in an encoding relationship, and two frames are not adjacent in playing order), specifically, describing how each block of a previous frame moves to a position in a current frame. The method is often used by a video compressor/video encoder to reduce spatial redundancy in a video sequence. Adjacent frames are often similar, that is, include a plurality of redundancy. The motion compensation is used for improving a compression rate by removing the redundancy.

BV: block vector.

BVP: block vector prediction.

BVD: block vector difference, a difference between BVP and a real estimated value of BV.

I slice: intra slice. An image may be divided into one frame or two fields, and a frame may be divided into one or more slices.

ISOBMFF: ISO based media file format. ISOBMFF is a media file encapsulation standard, a most typical ISOBMFF file is a moving picture experts group 4 (MP4) file.

FIG. 1 schematically shows a schematic diagram of a video processing process according to some embodiments.

As shown in FIG. 1, a complete video processing process may include video acquisition, video encoding, video file encapsulation, video file transmission, video file decapsulation, video decoding, and final video presentation.

It can be learned that after a video file is encoded, an encoded data stream needs to be encapsulated and transmitted to a user. A user terminal needs to perform inverse operations such as decapsulation and decoding to finally present video content.

Generation of video file content may include a real scene acquired by a camera and a screen content scene generated by a computer in terms of a signal obtaining manner. Due to different statistical characteristics, corresponding compression encoding methods may also be different. The video file may be compressed by using a standard compression algorithm such as VVC and HEVC or some specific compression algorithms designed for the content.

Figure 2:
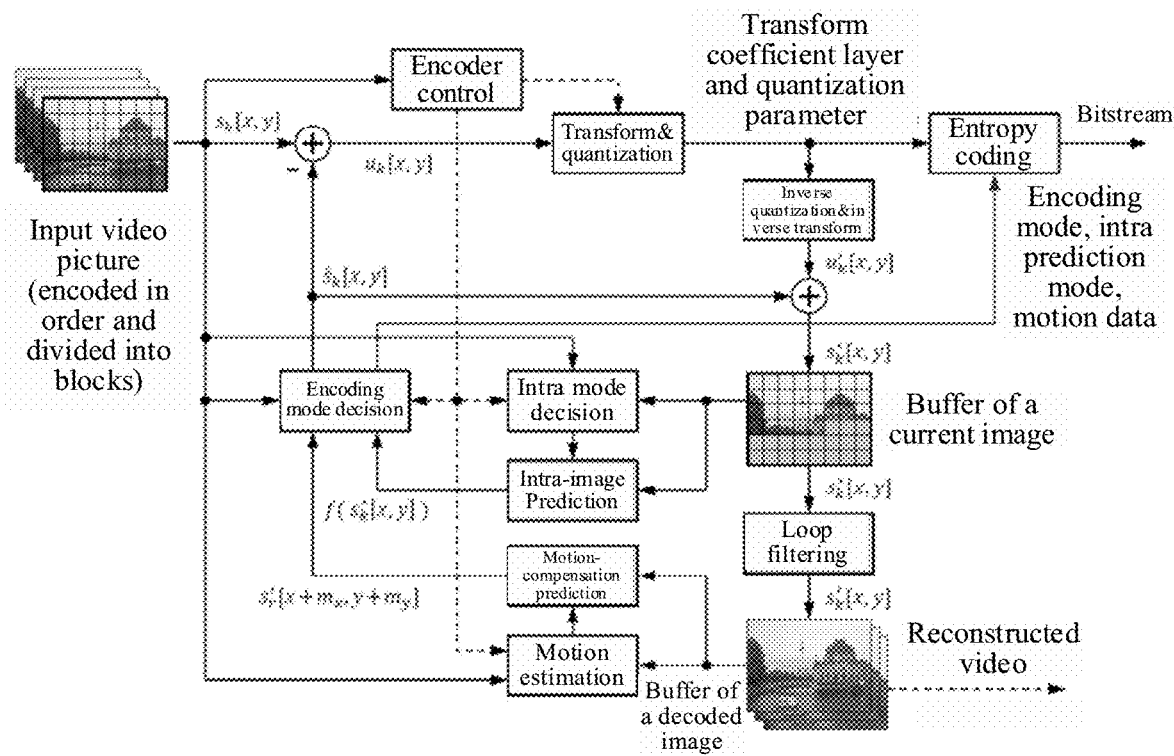
FIG. 2 schematically shows a basic block diagram of video encoding according to some embodiments.

Some video encoding technologies such as HEVC, VVC, and AVS adopt a hybrid coding framework. As shown in FIG. 2, pictures (or referred to as input video pictures) in an input original video signal (input video) are sequentially encoded, and the following series of operations and processing are performed.

(1) Block partition structure: the input video pictures are divided into a plurality of non-overlapping processing units, and a similar compression operation is performed on each processing unit. This processing unit may be referred to as a CTU or an LCU. A finer division may be continuously performed downward from the CTU or the LCU, to obtain at least one basic coding unit, which is referred to as a CU. Each CU is the most basic element in an encoding link. The following describes various encoding manner that may be employed for each CU.

(2) Predictive coding includes intra prediction and inter prediction. The original video signal is predicted by using a selected reconstructed video signal to obtain a residual signal. An encoder side needs to select the most appropriate one of possible predictive coding modes for a current CU, and informs a decoder side.

a. Intra prediction: a prediction signal comes from a region that has been encoded and reconstructed in a same image.

The basic idea of intra prediction is to remove spatial redundancy by using the correlation of adjacent pixels. In video encoding, adjacent pixels refer to reconstructed pixels of an encoded CU around the current CU.

b. Inter prediction: a prediction signal comes from another image (referred to as a reference image) that has been encoded and is different from the current image.

(3) Transform & Quantization: after transform operations such as discrete Fourier transform (DFT) and discrete cosine transform (DCT) are performed on the residual signal, the residual signal is converted into a transform domain, which is referred to as a transform coefficient. A lossy quantization operation is further performed on the residual signal in the transform domain, to lost specific information, so that the quantized signal is beneficial to compression expression.

In some video coding standards, more than one transformation mode may be selected. Therefore, the encoder side also needs to select one transformation for the current CU to be encoded, and inform the decoder side.

A fineness of quantization is usually determined by using a quantization parameters (QP). When a value of the QP is relatively large, it indicates that the transform coefficient in a larger value range is quantized into a same output. Therefore, a larger distortion and a relatively low code rate are usually caused. In contrast, when a value of the QP is relatively small, it indicates that the transform coefficient in a smaller value range is quantized into the same output.

Therefore, a relatively small distortion is usually caused, which corresponds to a relatively high code rate.

(4) Entropy coding or statistical coding: statistical compression coding is performed on the quantized transform domain signal according to a frequency of each value, to finally output a binary (0 or 1) compressed bitstream.

In addition, other information such as a selected coding mode and a motion vector is generated through encoding and entropy coding also needs to be performed to reduce the code rate.

The statistical coding is a lossless encoding manner, and the code rate required for expressing a same signal can be effectively reduced. A common statistical coding manner includes variable length coding (VLC) or context adaptive binary arithmetic coding (CABAC).

(5) Loop filtering: inverse quantization, inverse transformation, and predictive compensation (inverse operations of operation (2) to operation (4)) may be performed on the encoded picture, to obtain a reconstructed decoded picture. Compared with the original input picture, due to the effect of quantization, partial information in the reconstructed decoded picture is different from the original input picture, and distortion is generated. A filtering operation such as deblocking filtering, sample adaptive offset (SAO), or adaptive loop filtering (ALF) is performed on the reconstructed decoded picture, to effectively reduce a degree of distortion generated by quantization. Because the filtered reconstructed decoded pictures are used as a reference for subsequent to-be-encoded pictures for predicting future signals, the filtering operation described above is also referred to as loop filtering and a filtering operation within an encoding loop.

FIG. 2 shows a basic flowchart of a video encoder. In FIG. 2, a description is made by taking a $k^{th}$ CU (which is denoted as $s_k[x,y]$) as an example. K is a positive integer greater than or equal to 1 and less than or equal to a quantity of CUs in an inputted current image, $s_k[x,y]$ represents a pixel of which coordinates are [x,y] in the $k^{th}$ CU, x represents a horizontal coordinate of the pixel, and y is a longitudinal coordinate of the pixel. After better processing of motion compensation or intra prediction is performed on $s_k[x,y]$, a prediction signal $s_k[x,y]$ is obtained, $s_k[x,y]$ is subtracted from $s_k[x,y]$, to obtain a residual signal $u_k[x,y]$, and then transform and quantization is performed on the residual signal $u_k[x,y]$. The outputted quantized data has two different destinations: one is to be sent to an entropy encoder for entropy coding, and the encoded bitstream is output to a buffer to be stored and wait to be transmitted; and the other application is to obtain a signal $u'_k[x,y]$ after inverse quantization and inverse transformation. The signal $u'_k[x,y]$ is added with $s_k[x,y]$ to obtain a new prediction signal $s^*_k[x,y]$, and $s^*_k[x,y]$ is sent to a buffer of a current image to be stored. Intra-image prediction is performed on $s^*_k[x,y]$, to obtain $f(s^*_k[x,y])$. Loop filter is performed on $s^*_k[x,y]$, to obtain $s'_k[x,y]$, and $s'_k[x,y]$ is sent to a buffer of a decoded image to be stored, to generate a reconstructed video. Motion-compensation prediction is performed on $s'_k[x,y]$, to obtain $s'_r[x+m_x,y+m_y]$, $s'_r[x+m_x,y+m_y]$ representing a reference block, and $m_x$ and $m_y$, respectively representing a horizontal component and a vertical component of a motion vector.

According to the above encoding process, it can be learned that, at the decoder side, for each CU, after the decoder first performs entropy decoding after obtaining the compressed bitstream, to obtain various mode information and quantized transform coefficients. Inverse quantization and inverse transformation are performed on each transform coefficient to obtain a residual signal. On the other hand, according to known encoding mode information, a prediction signal corresponding to the CU may be obtained, and after the prediction signal and the residual signal are added, a reconstructed signal may be obtained. Finally, a loop filtering operation needs to be performed on a reconstructed value of a decoded image, to generate a final output signal.

The file encapsulation method provided in the embodiments of the present disclosure may be performed by any electronic device. In the following example, a description is made by using an example in which the file encapsulation method is performed by a server, but the present disclosure is not limited thereto.

The server may be an independent server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, big data, and an artificial intelligence platform.

Figure 3:
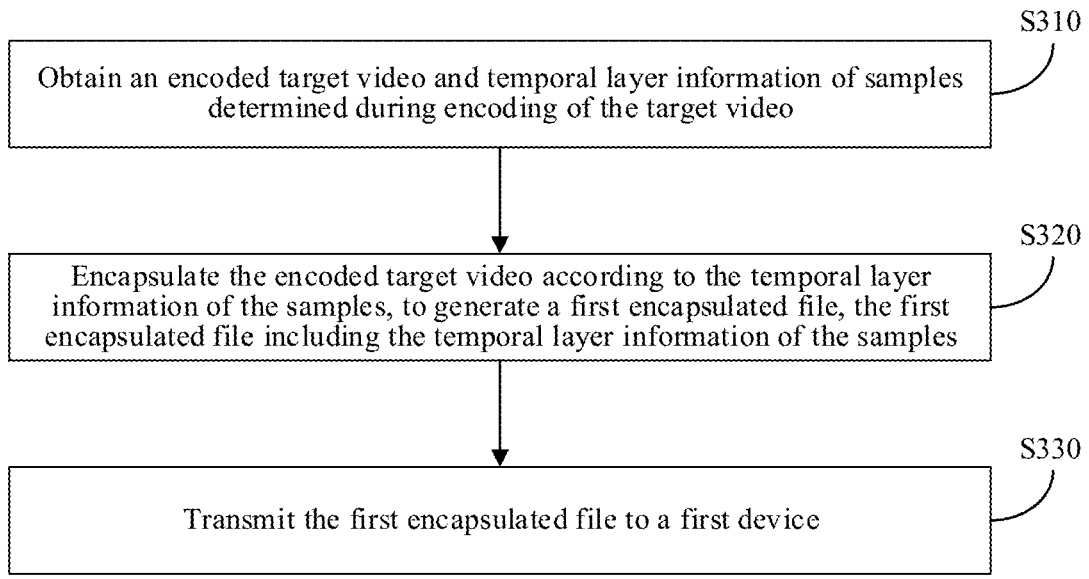
FIG. 3 schematically shows a flowchart of a file encapsulation method according to some embodiments.

FIG. 3 schematically shows a flowchart of a file encapsulation method according to some embodiments.

As shown in FIG. 3, the file encapsulation method provided in some embodiments include the following operations.

Operation S310. Obtain an encoded target video and temporal layer information of samples determined during encoding of the target video.

In some embodiments, the target video may be any one of a video or an image and may be combined with another content such as audio and a text. This is not limited in the present disclosure. The target video includes a plurality of samples.

In some embodiments, a sample is an encapsulation unit when a media file is encapsulated, and one media file includes a plurality of samples. For example, the media file is a video media, and a sample of the video media is usually a video frame. A description is made below by using an example in which a sample is a video frame in a target video, but this is not limited in the present disclosure.

In a video encoding technology, to more flexibly organize video frames, a technology of performing layer division on video frames in a target video in temporal domain may be adopted. The video frames in the target video may be divided into a plurality of layers in the temporal domain by limiting and classifying interframe dependency relationships among the video frames, the plurality of layers are referred to as temporal layers, and information about the temporal layers is referred to as temporal layer information. On one hand, a video frame in a lower temporal layer may not depend on a video frame in a higher temporal layer during decoding.

The lower temporal layer and the higher temporal layer mentioned in some embodiments are relative instead of classifying a temporal layer within a range as "low" and a temporal layer within another range as "high" based on this. For a target video or a target track of the target video, after temporal layers corresponding to video frames included in the target video are determined, it is assumed that there are a total of four temporal layers from $L_0$ to $L_3$ from low to high. Therefore, for the temporal layer $L_0$, $L_1$ to $L_3$ are higher temporal layers; for the temporal layer $L_1$, $L_0$ is a lower temporal layer, and $L_2$ and $L_3$ are higher temporal layers; for the temporal layer $L_2$, $L_0$ and $L_1$ are lower temporal layers, and $L_3$ is a higher temporal layer; and for the temporal layer $L_3$, $L_0$ to $L_2$ are lower temporal layers.

Operation S320. Encapsulate the encoded target video according to the temporal layer information of the samples, to generate a first encapsulated file, the first encapsulated file including the temporal layer information of the samples.

Operation S330. Transmit the first encapsulated file to a first device.

In some embodiments, the first device may be, for example, a video transmission intermediate node such as a content delivery network (CDN) node; or may be, in another example, any user terminal that finally consumes the target video, the target video being presented on the user terminal.

The user terminal may be, for example, a smartphone, a tablet computer, a notebook computer, a desktop computer, a smart speaker, a smart wearable device, a virtual reality device, an augmented reality device, or the like, but is not limited thereto.

In some embodiments, various clients such as a video client, a game client, an instant messaging client, and a news client may be installed on the user terminal.

According to the file encapsulation method provided in the implementations of the present disclosure, temporal layer information corresponding to a target video is indicated in a first encapsulated file of the target video, on one hand, a first device for video transmission and consumption can more conveniently obtain the temporal layer information during network transmission and consumption without decoding an encoded bitstream of the target video, to save a large amount of computing resources. On the other hand, the first device can also obtain the temporal layer information of the target video in time even without an implementation capability of a decoding algorithm, so as to better guide transmission and decoding processes of the target video.

Figure 4:
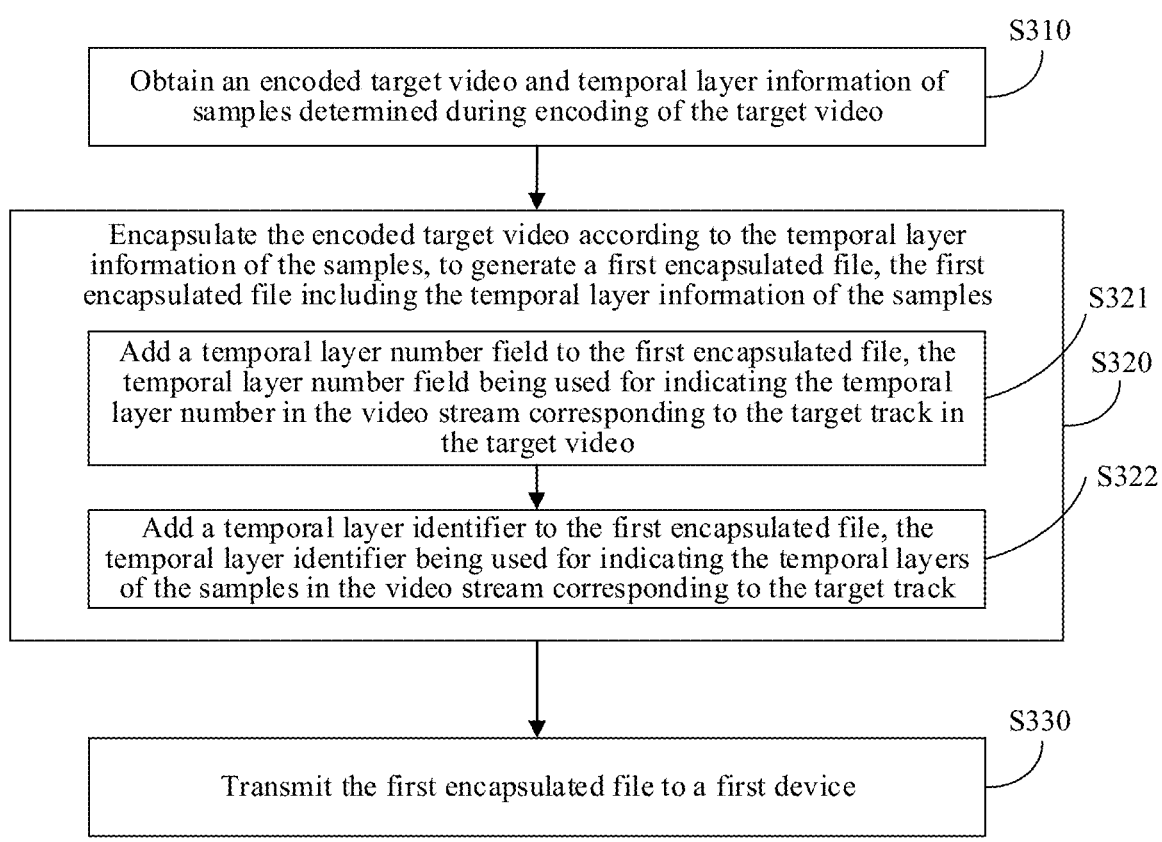
FIG. 4 schematically shows a flowchart of a file encapsulation method according to some embodiments.

FIG. 4 schematically shows a flowchart of a file encapsulation method according to some embodiments. As shown in FIG. 4, the file encapsulation method provided in some embodiments may include the following operations.

Operation S310. Obtain an encoded target video and temporal layer information of samples determined during encoding of the target video.

In some embodiments, the temporal layer information of the samples determined during encoding of the target video may include: a temporal layer number in a video stream corresponding to a target track in the target video and temporal layers of samples in the video stream corresponding to the target track.

Figure 5:
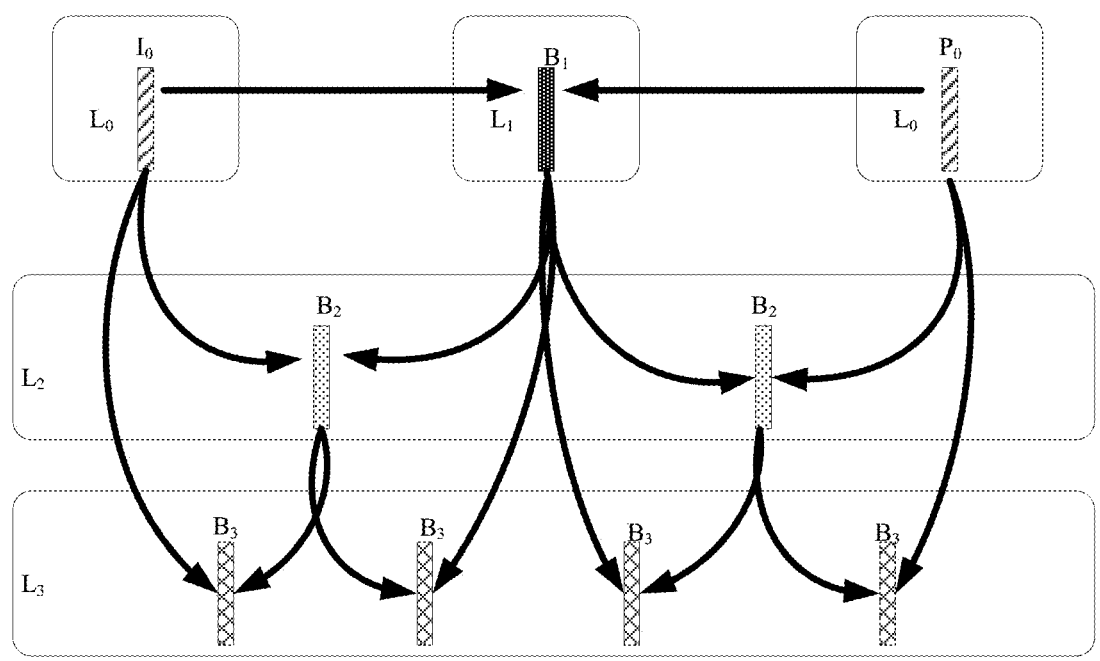
FIG. 5 schematically shows a schematic diagram of a decoding dependence between video frames according to some embodiments.

For example, as shown in FIG. 5, at a video encoding stage of a target video, different video frames in the target video are divided into different temporal layers according to dependency relationships during decoding by using a temporal scalability technology.

During target video compression, to save a storage space, various compression algorithms are often adopted to reduce a data capacity, for example, an I frame, a P frame, and a B frame may be used. The I frame is a key frame and belongs to intra-frame compression, and only information about the I frame needs to be used during decoding. The P frame is a forward predicted coded frame, that is, the P frame can be decoded with reference to information about a previous related frame. The B frame is a bidirectional prediction coded frame, and the B frame is decoded with reference to a previous decoded frame and a subsequent to-be-decoded frame. Both the B frame and the P frame compress data based on the I frame. In the following example, Arabic numeral subscripts are added to the I frame, the P frame, and the B frame for indicating corresponding temporal layers of the I frame, the P frame, and the B frame.

Specifically, a video frame in a lower temporal layer does not need to refer to a video frame in a higher temporal layer during decoding. For example, in FIG. 5, it is assumed that video frames in the target video include a total of four temporal layers, which are sequentially represented as $L_0$, $L_1$, $L_2$, and $L_3$ from a lower temporal layer to a higher temporal layer. Arrows represent dependency relationships during decoding, an arrow from an $I_0$ frame to a $B_1$ frame represents the $B_1$ frame in the temporal layer $L_1$ needs to refer to the $I_0$ frame in the temporal layer $L_0$ during decoding, and relationships among remaining frames are deduced by analogy. The $B_1$ frame in the temporal layer $L_1$ needs to refer to a $P_0$ frame in the temporal layer $L_0$ during decoding, a first $B_2$ frame in the temporal layer $L_2$ needs to refer to the $I_0$ frame in the temporal layer $L_0$ and the $B_1$ frame in the temporal layer $L_1$ during decoding, a second $B_2$ frame in the temporal layer $L_2$ needs to refer to the $B_1$ frame in the temporal layer $L_1$ and the $P_0$ frame in the temporal layer $L_0$ during decoding, a first $B_3$ frame in the temporal layer $L_3$ needs to refer to the $I_0$ frame in the temporal layer $L_0$ and the first $B_2$ frame in the temporal layer $L_2$ during decoding, a second $B_3$ frame in the temporal layer $L_3$ needs to refer to the first $B_2$ frame in the temporal layer $L_2$ and the $B_1$ frame in the temporal layer $L_1$ during decoding, a third $B_3$ frame in the temporal layer $L_3$ needs to refer to the $B_1$ frame in the temporal layer $L_1$ and the second $B_2$ frame in the temporal layer $L_2$ during decoding, and a fourth $B_3$ frame in the temporal layer $L_3$ needs to refer to the second $B_2$ frame in the temporal layer $L_2$ and a second $P_0$ frame in the temporal layer $L_0$ during decoding.

It can be learned from the interframe dependency relationships in FIG. 5 that all the video frames are divided into the four temporal layers $L_0$, $L_1$, $L_2$, and $L_3$ according to the dependency relationships, and a video frame corresponding to each temporal layer does not depend on a video frame in a higher temporal layer than the temporal layer during decoding. Based on the temporal scalability technology, during transmission and decoding of the target video, video frames in some temporal layers may be selectively discarded without affecting decoding of another video frame.

Operation S320. Encapsulate the encoded target video according to the temporal layer information of the samples, to generate a first encapsulated file, the first encapsulated file including the temporal layer information of the samples.

In an embodiment of FIG. 4, operation S320 in the embodiment of FIG. 3 may further include the following operations.

Operation S321. Add a temporal layer number field (for example, temporal_layer_num) to the first encapsulated file, the temporal layer number field being used for indicating the temporal layer number in the video stream corresponding to the target track in the target video.

Operation S322. Add a temporal layer identifier (for example, temporal_layer_id) to the first encapsulated file, the temporal layer identifier being used for indicating the temporal layers of the samples in the video stream corresponding to the target track.

A value of the temporal layer identifier in the first encapsulated file ranges from 0 to the temporal layer number minus 1 (that is, a value of temporal_layer_id is 0 to temporal_layer_num−1).

For operation S330 in the embodiment of FIG. 4, reference may be made to the foregoing embodiments.

Although an AVS3 video encoding technology supports the temporal layer division technology, the AVS3 encoding technology indicates information such as a layer number and a maximum quantity of layers of an image frame only in an encoded bitstream. Considering operation complexity of video decoding and a reality that a plurality of network devices do not support implementation of a decoding algorithm, to more conveniently obtain temporal layer information during network transmission and determine priorities of image frames during transmission according to the temporal layer information, it is necessary to indicate corresponding temporal layer information in file encapsulation.

According to the file encapsulation method provided in some embodiments, for a temporal layer division algorithm provided in a video encoding standard such as AVS3, a corresponding file encapsulation method for temporal layer division is provided in combination with an application scenario of the temporal layer division. Temporal layer information corresponding to a target video is indicated in a first encapsulated file of the target video, and a temporal layer number field and a temporal layer identifier are added to the first encapsulated file, to indicate temporal layers of samples in the target video. On one hand, a first device for video transmission and consumption can more conveniently obtain the temporal layer information during network transmission and consumption without decoding an encoded bitstream of the target video, to save a large amount of computing resources. On the other hand, the first device can also obtain the temporal layer information of the target video in time even without an implementation capability of a decoding algorithm, so as to better guide transmission and decoding processes of the target video. In addition, the video transmission intermediate node and the user terminal that consumes the target video selectively discard video frames in a higher temporal layer according to a network status and a device capability without affecting decoding of another video frame in a lower temporal layer, thereby achieving an effect of reducing network load and device load on the premise of ensuring viewing experience of a user to the utmost.

Figure 6:
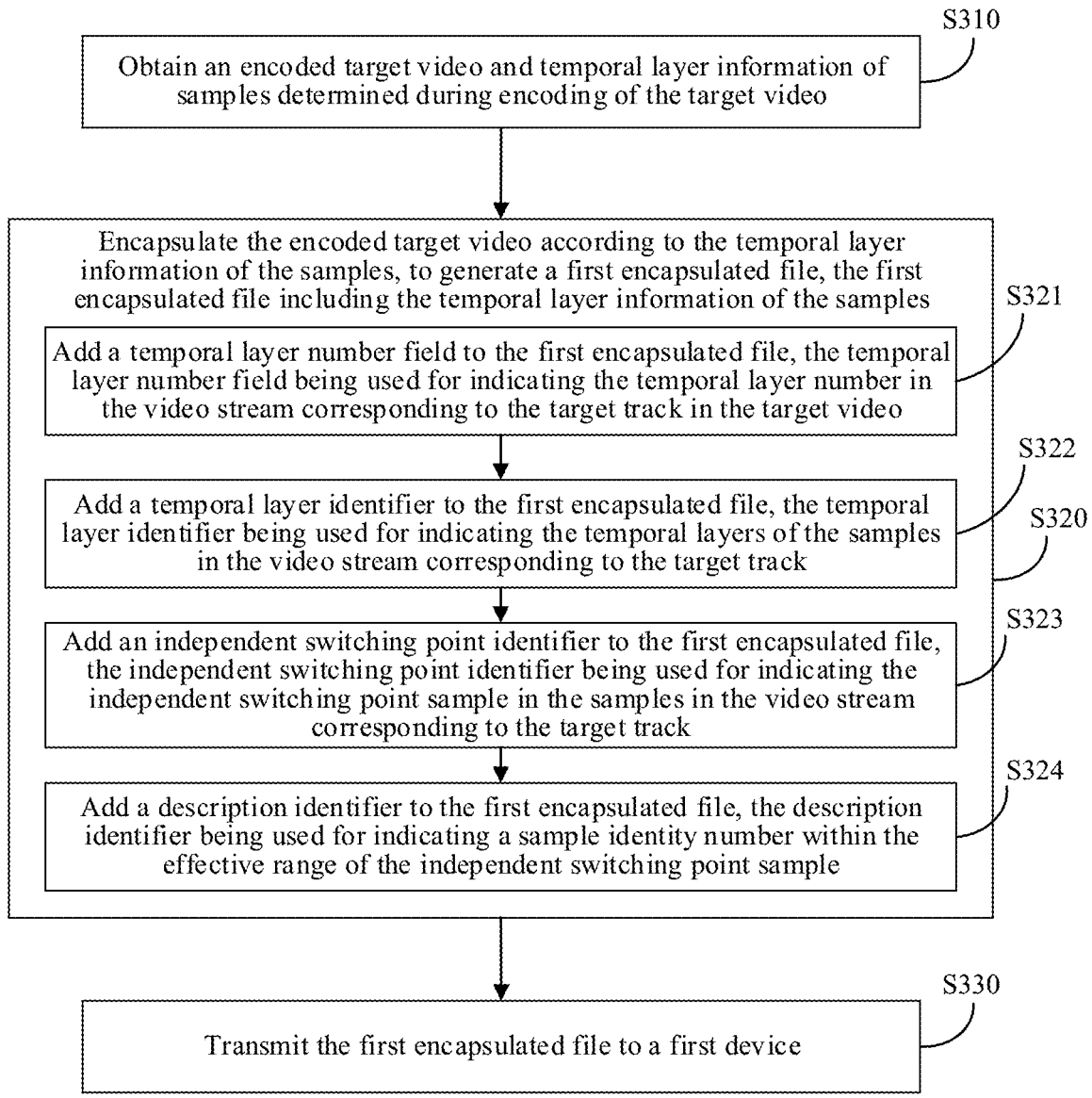
FIG. 6 schematically shows a flowchart of a file encapsulation method according to some embodiments.

FIG. 6 schematically shows a flowchart of a file encapsulation method according to some embodiments. As shown in FIG. 6, the file encapsulation method provided in some embodiments may include the following operations.

Operation S310. Obtain an encoded target video and temporal layer information of samples determined during encoding of the target video.

In some embodiments of FIG. 6, in addition to including the temporal layer number in the video stream corresponding to the target track in the target video and the temporal layers of the samples in the video stream corresponding to the target track in the embodiments of FIG. 5, the temporal layer information of the samples determined during encoding of the target video may further include an independent switching point sample in the samples in the video stream corresponding to the target track and an effective range of the independent switching point sample.

In the temporal scalability technology, in addition to a characteristic that the video frame in the lower temporal layer does not depend on the video frame in the higher temporal layer during decoding, by limiting the interframe dependency relationships, within video frames in a specific range (that is, an effective range of and independent switching point described below), video frames in a same temporal layer after (referring to being after in terms of decoding order) a video frame may not depend on video frames in a same temporal layer before the video frame during decoding, and such a special video frame may be referred to as a temporal layer switching point or an independent switching point sample or an independent switching point video frame.

Still further, video frames in a temporal layer higher than a temporal layer of the independent switching point video frame after (referring to being after in terms of decoding order) the independent switching point video frame may not depend on video frames in a same temporal layer or a higher temporal layer relative to the independent switching point video frame before the independent switching point video frame during decoding.

In some embodiments, the effective range of the independent switching point sample is specified by using an action interval of the independent switching point sample. However, in another standard/solution, the effective range of the independent switching point sample may be specified in another division manner, that is, interframe non-dependency is effective within a specific range.

For example, as shown in FIG. 7, it is assumed that there are video frames I0, P1, P2, P3, P4, P5, P6, P7, and P8 in a target video, the I0 frame being an instantaneous decoding refresh (IDR) frame, and the IDR frame belonging to the I frame. In addition, it is assumed that the video frames I0, P4, and P8 are in a temporal layer $L_0$, the video frames P2 and P6 are in a temporal layer $L_1$, and the video frames P1, P3, P5, and P7 are in a temporal layer $L_2$. It can be learned that all the video frames P1, P2, P3, and P5 are independent switching point samples of the temporal layers.

For example, in FIG. 7, the video frame P2 is the independent switching point sample, all the video frames P3, P5, and P7 in the temporal layer higher than that of the video frame P2 after the video frame P2 do not depend on the video frames in the same temporal layer or the higher temporal layer relative to the video frame P2 before the video frame P2 during decoding, that is, decoding of the video frames P3, P5, and P7 has no relationship with the video frame P1.

Operation S320. Encapsulate the encoded target video according to the temporal layer information of the samples, to generate a first encapsulated file, the first encapsulated file including the temporal layer information of the samples.

In some embodiments of FIG. 4, operation S320 in the embodiment of FIG. 3 may further include the following operations.

Operation S321. Add a temporal layer number field to the first encapsulated file, the temporal layer number field being used for indicating the temporal layer number in the video stream corresponding to the target track in the target video.

Operation S322. Add a temporal layer identifier to the first encapsulated file, the temporal layer identifier being used for indicating the temporal layers of the samples in the video stream corresponding to the target track.

For operation S321 and operation S322 in some embodiments of FIG. 6, reference may be made to the foregoing embodiments.

Operation S323. Add an independent switching point identifier to the first encapsulated file, the independent switching point identifier being used for indicating the independent switching point sample in the samples in the video stream corresponding to the target track.

In some embodiments, the independent switching point identifier may include a same layer switching point identifier (for example, same_layer_switch_flag).

The adding an independent switching point identifier to the first encapsulated file, the independent switching point identifier being used for indicating the independent switching point sample in the samples in the video stream corresponding to the target track may include: setting the same layer switching point identifier of the independent switching point sample to a first value in a case that a temporal layer identifier of the independent switching point sample is greater than 0 and the independent switching point sample and samples in a same temporal layer after the independent switching point sample do not depend on samples in a same temporal layer before the independent switching point sample during decoding.

In some embodiments, the independent switching point identifier may include a higher layer switching point identifier (for example, higher_layer_switch_flag).

The adding an independent switching point identifier to the first encapsulated file, the independent switching point identifier being used for indicating the independent switching point sample in the samples in the video stream corresponding to the target track may further include: setting the higher layer switching point identifier of the independent switching point sample to the first value in a case that the temporal layer identifier of the independent switching point sample is greater than 0 and samples in a higher temporal layer after the independent switching point sample do not depend on samples in a same temporal layer or a higher temporal layer relative to the independent switching point sample before the independent switching point sample during decoding.

In a case that the higher layer switching point identifier of the independent switching point sample is the first value, the same layer switching point identifier of the independent switching point sample is the first value.

Operation S324. Add a description identifier (for example, group_description_index) to the first encapsulated file, the description identifier being used for indicating a sample identity number within the effective range of the independent switching point sample.

In some embodiments, the encapsulating the encoded target video, to generate a first encapsulated file may further include: adding a quantity field (for example, group_index_count) to the first encapsulated file according to a quantity of samples within the effective range of the independent switching point sample.

For operation S330 in some embodiments of FIG. 6, reference may be made to the foregoing embodiments.

According to the file encapsulation method provided in the implementations of the present disclosure, temporal layer information corresponding to a target video is indicated in a first encapsulated file of the target video, and a temporal layer number field and a temporal layer identifier are added to the first encapsulated file, to indicate temporal layers of samples in the target video. On one hand, a first device for video transmission and consumption can more conveniently obtain the temporal layer information during network transmission and consumption without decoding an encoded bitstream of the target video, to save a large amount of computing resources. On the other hand, the first device can also obtain the temporal layer information of the target video in time even without an implementation capability of a decoding algorithm, so as to better guide transmission and decoding processes of the target video. In addition, the video transmission intermediate node and the user terminal that consumes the target video selectively discard video frames in a higher temporal layer according to a network status and a device capability without affecting decoding of another video frame in a lower temporal layer, thereby achieving an effect of reducing network load and device load on the premise of ensuring viewing experience of a user to the utmost. In addition, an independent switching point identifier indicating an independent switching point sample in samples in a video stream corresponding to a target track of the target video and a description identifier indicating a sample identity number within an effective range of the independent switching point sample may further be added to the first encapsulated file, so that the video transmission intermediate node and the user terminal that consumes the target video may further selectively discard video frames before the independent switching point sample and in a same temporal layer as the independent switching point sample according to a network status and a device capability without affecting decoding of another video frame in a lower temporal layer or the same temporal layer, thereby further achieving the effect of reducing the network load and the device load.

The file encapsulation method is described below by using an example in which temporal layers of video frames in a target video and whether a sample is an independent switching point sample are indicated in the first encapsulated file.

Some embodiments provide a file encapsulation method for a temporal layer division technology in AVS3 encoding. The specific implementation operations are as follows:

1. Determine temporal layers for different video frames of a target video according to interframe dependency relationships among the video frames in a video encoding link. Further, an independent switching point sample in the video frames of the target video and an effective range of the independent switching point sample may further be determined.

For example, the temporal layers of the video frames of the target video may be determined in the inter prediction part (which corresponds to motion compensating prediction and motion estimation parts in FIG. 2) in FIG. 2. If a frame A needs a frame B for inter prediction, the frame A depends on the frame B.

2. Set databox information such as a temporal_layer_num field in Avs3DecoderConfigurationRecord databox corresponding to a target track and related to the temporal layers according to the temporal layers of the video frames determined in the encoding link. In addition, the video frames are divided into different temporal layer sample groups (sample groups for short below) according to the temporal layers of the video frames and the independent switching point sample, and fields corresponding to temporal layer sample group entries (TemporalLayerSampleGroupEntry) are set.

3. Network transmission intermediate nodes may selectively discard, according to the databox information related to the temporal layers and a network status in a first encapsulated file, some video frames that do not affect entire encoding and decoding of the target video during network transmission, to achieve a purpose of reducing network load pressure.

4. A user terminal may selectively discard, according to a device capability, some video frames that do not affect the entire encoding and decoding of the target video at a terminal device side, to achieve a purpose of reducing complexity of a decoding algorithm.

To support the operations provided in some embodiments, a plurality of descriptive fields may be added to a system layer. In the following, for example, related fields are defined in a form of extending an ISOBMFF databox, to support AVS3 temporal layer division technology. Specifically, (a modified part is identified by italics)

```
        class Avs3DecoderConfigurationRecord{//AVS3 decoder configuration recorder
        unsigned int(8) configurationVersion;//8-bit unsigned integer configuration version
field
        unsigned int(8) profile_id; //profile identifier
        unsigned int(8) level_id; //level identifier
        bit(6) reserved='11111 1'b;//reserved field, a general field needs to be an integer byte,
and thus needs to be supplemented with reserved bits.
        unsigned int(2) chroma_format;//chroma format
        bit(5) reserved='11111'b;
        unsigned int(3) encoding_precision;//encoding precision
        bit(4) reserved='1111'b;
        unsigned int(4) frame_rate_code;//encoding frame rate
        bit(6) reserved='111111'b;
        unsigned int(2) library_indication;//library indication
        bit(5) reserved='11111'b;
        unsigned int(3) temporal_layer_num;
        }
        class TemperalLayerSampleGroupEntry extend VisualSampleGroupEntry ('telg') {
            unsigned int(8) temporal_layer_id;
            unsigned int(1) same_layer_switch_flag;
            unsigned int(1) higher_layer_switch_flag;
            bit(6) reserved;
            if(same_layer_switch_flag==1\\higher_layer_switch_flag==1){
                unsigned int(32) group_index_count;
                for(i=0; i<group_index_count; i++){
                    unsigned int(32) group_description_index;
        }
            }
        }
```

The temporal layer sample group entry TemporalLayerSampleGroupEntry is obtained by extending a video sample group entry VisualSampleGroupEntry, which corresponds to a sample (that is, a video frame) of the sample group entry, and a temporal layer identifier is indicated by temporal_layer_id.

A meaning of each field is as follows:

temporal_layer_num is a temporal layer number field, indicating a maximum temporal layer number in a video stream corresponding to a target track, and a value of the field may be, for example, 1 to 7.

temporal_layer_id is a temporal layer identifier, indicating a temporal layer identifier of the sample corresponding to the sample group entry, and a value of the field may be 0 to temporal_layer_num−1. same_layer_switch_flag is a same layer switching point identifier, indicating whether the sample corresponding to the sample group entry is an independent switching point sample in the temporal layer. If a value of the flag is a first value, for example, 1, the independent switching point sample (temporal_layer_id needs to be greater than 0) and samples in a same temporal layer after (in terms of decoding order) the independent switching point sample do not depend on samples in a same temporal layer before the independent switching point sample during decoding. An effective range of the independent switching point sample is a sample group set corresponding to all description identifiers group_description_index.

higher_layer_switch_flag is a higher layer switching point identifier, indicating whether the sample corresponding to the sample group entry is an independent switching point sample in the temporal layer. If a value of the flag is the first value, for example, 1, samples in a higher temporal layer after (in terms of decoding order) the independent switching point sample (temporal_layer_id needs to be greater than 0) do not depend on samples in a same temporal layer or a higher temporal layer relative to the independent switching point sample before the independent switching point sample during decoding, and all the sample in the same temporal layer and the higher temporal layer do not depend on the samples. An effective range of the independent switching point sample is a sample group set corresponding to all description identifiers group_description_index. In addition, when the value of higher layer switch flag is 1, same_layer_switch_flag needs to be 1.

group_index_count is a quantity field, indicating a quantity of sample groups corresponding to the effective range of the independent switching point sample (a quantity of samples within the effective range corresponding to the independent switching point sample in addition to a current sample group).

group_description_index indicates a sample group identity number within the effective range of the independent switching point sample (which corresponds to a sample identity number within the effective range of the independent switching point sample).

The file transmission method provided in the embodiments of the present disclosure may be performed by any electronic device. In the following example, a description is made by using an example in which the file transmission method is performed by a video transmission intermediate node such as a CDN node as the first device, but the present disclosure is not limited thereto.

FIG. 8 schematically shows a flowchart of a file transmission method according to some embodiments. As shown in FIG. 8, the file transmission method provided in some embodiments may include the following operations.

Operation S810. Receive a first encapsulated file, the first encapsulated file being generated by encapsulating an encoded target video according to temporal layer information of samples of the target video, the target video including the samples, the temporal layer information being determined during encoding of the target video, and the first encapsulated file including the temporal layer information of the samples.

Operation S820. Determine a to-be-transmitted sample in the target video according to the temporal layer information of the samples in the first encapsulated file.

In some embodiments, before the determining a to-be-transmitted sample in the target video according to the temporal layer information of the samples in the first encapsulated file, the method may include: obtaining network status information of a second device; transmitting the first encapsulated file to the second device in a case that it is determined that the second device is in a first network state according to the network status information; and performing the operation in operation S820 in a case that it is determined that the second device is not in the first network state.

In some embodiments, the determining a to-be-transmitted sample in the target video according to the temporal layer information of the samples in the first encapsulated file may include: selectively discarding some samples in the target video according to the temporal layer information of the samples in the first encapsulated file and the network status information of the second device; re-encapsulating the target video obtained after the some samples are selectively discarded, to generate a second encapsulated file; and transmitting the second encapsulated file to the second device.

In some embodiments, the temporal layer information includes: an independent switching point identifier, used for indicating an independent switching point sample in samples in a video stream corresponding to a target track; and a description identifier, used for indicating a sample identity number within an effective range of the independent switching point sample. The selectively discarding some samples in the target video according to the temporal layer information of the samples in the first encapsulated file and the network status information of the second device may include: obtaining the independent switching point sample in the samples according to the independent switching point identifier in the first encapsulated file in a case that it is determined that the second device is in a second network state according to the network status information; and selectively discarding samples within the effective range of the independent switching point sample and before the independent switching point sample according to the description identifier.

In some embodiments, the first encapsulated file includes a temporal layer number field and a temporal layer identifier, the temporal layer number field being used for indicating a temporal layer number in a video stream corresponding to a target track in the target video; and the temporal layer identifier being used for indicating temporal layers of samples in the video stream corresponding to the target track. The selectively discarding some samples in the target video according to the temporal layer information of the samples in the first encapsulated file and the network status information of the second device may include: obtaining samples in a higher temporal layer in the samples according to the temporal layer number field and the temporal layer identifier in the first encapsulated file in a case that it is determined that the second device is in a third network state according to the network status information; and selectively discarding the samples in the higher temporal layer in the samples.

Operation S830. Transmit the to-be-transmitted sample in the target video to a second device.

In some embodiments, the second device may be, for example, a user terminal that finally consumes the target video.

For another content in some embodiments, reference may be made to the content in the foregoing file encapsulation method embodiments.

How the intermediate node transmits the target video in a targeted manner according to a network status of the second device is described below by using a specific application scenario as an example.

1. It is assumed that a server encodes and encapsulates a video file A (a target video). It is assumed that there are three temporal layers $L_0$ to $L_2$ in the video file A, and video frames of the three temporal layers are divided into a total of six sample groups G1 to G6. Each field of a corresponding databox in a first encapsulated file of the target video is as follows.

--- temporal_layer_num=3 in Avs3DecoderConfigurationRecord;
G1: temporal_layer_id=0; same_layer_switch_flag=0; higher_layer_switch_flag=0;
G2: temporal_layer_id=1; same_layer_switch_flag=0; higher_layer_switch_flag=0;
G3: temporal_layer_id=1; same_layer_switch_flag=1; higher_layer_switch_flag=0; group_index_count=1; group_description_index=2;
G4: temporal_layer_id=2; same_layer_switch_flag=0; higher_layer_switch_flag=0;
G5: temporal_layer_id=1; same_layer_switch_flag=1; higher_layer_switch_flag=0; group_index_count=2; group_description_index=4.6;
G6: temporal_layer_id=2; same_layer_switch_flag=0; higher_layer_switch_flag=0.

---

2. The server respectively transmit the video file A to user terminals corresponding to a user 1, a user 2, and a user 3 according to client requests transmitted by second devices (for example, the user terminals corresponding to the users 1, 2, and 3).

3. In the network transmission intermediate nodes such as the CDN node, the intermediate nodes perform the following selections according to network statuses corresponding to different user terminals of the user 1, the user 2, and the user 3:

It is assumed that the user 1 has a good network state, that is, in a first network state, the first encapsulated file of the video file A may be directly transmitted to the user terminal corresponding to the user 1.

It is assumed that the user 2 has a poor network state, that is, in a second network state, because samples corresponding to the sample group G5 are independent switching point samples, and a corresponding effective range is G4 to G6, decoding of G6 does not depend on G4, and after samples corresponding to the sample group G4 may be selectively discard, the video file A may be re-encapsulated, to obtain a second encapsulated file, and the second encapsulated file is transmitted to the user terminal corresponding to the user 2.

It is assumed that the user 3 has an extremely poor network state, that is, in a third network state, all samples in the temporal layer $L_2$ may be selectively discarded directly, the video file A is encapsulated, to generate a second encapsulated file, and the second encapsulated file is transmitted to the user terminal corresponding to the user 3.

4. The user terminals corresponding to the users 1, 2, and 3 respectively receive corresponding video files A and perform decoding and consumption.

How to selectively discard some samples may be determined according to an actual situation, but is not limited to the foregoing examples. If some samples are discarded within the effective range of the independent switching point sample, samples before the independent switching point sample may be discarded, and the independent switching point sample cannot be discarded. If samples belonging to a temporal layer are discarded, the independent switching point sample in the temporal layer may also be discarded.

In the foregoing examples, if all the samples in the temporal layer $L_2$ are discarded and some samples need to be continuously discarded, samples corresponding to the sample group G2 belonging to the temporal layer $L_1$ may also be selectively discarded.

It may be understood that how to evaluate the network status information of the second device may be set according to an actual requirement, for example, may be determined according to a network delay and a packet loss rate. This is not limited in the present disclosure.

The file decoding method provided in some embodiments may be performed by any electronic device. In the following example, a description is made by using an example in which the file decoding method is performed by a second device such as a user terminal, but the present disclosure is not limited thereto.

Figure 9:
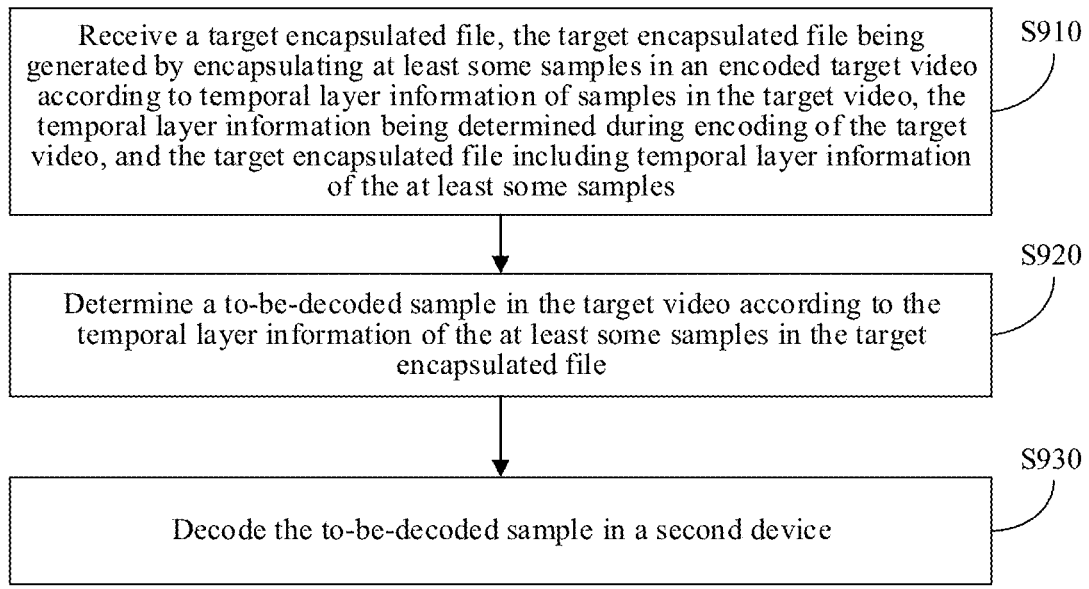
FIG. 9 schematically shows a flowchart of a file decoding method according to some embodiments.

FIG. 9 schematically shows a flowchart of a file decoding method according to some embodiments.

As shown in FIG. 9, the file decoding method provided in some embodiments may include the following operations.

Operation S910. Receive a target encapsulated file, the target encapsulated file being generated by encapsulating at least some samples in an encoded target video according to temporal layer information of samples in the target video, the temporal layer information being determined during encoding of the target video, and the target encapsulated file including temporal layer information of the at least some samples.

In some embodiments, the target encapsulated file may be any one of the first encapsulated file or the second encapsulated file of the target video in the foregoing embodiments. If the target encapsulated file is the first encapsulated file, the target encapsulated file may be received from a server and may be generated by encapsulating the samples in the encoded target video. If the target encapsulated file is the second encapsulated file, the target encapsulated file may be received from the intermediate node and may be generated by re-encapsulating remaining samples after some samples are discarded.

Operation S920. Determine a to-be-decoded sample in the target video according to the temporal layer information of the at least some samples in the target encapsulated file.

In some embodiments, before the determining a to-be-decoded sample in the target video according to the temporal layer information of the at least some samples in the target encapsulated file, the method may include: obtaining decoding capability information of a second device; using the at least some samples as the to-be-decoded samples in a case that it is determined that the second device is in a first decoding capability state according to the decoding capability information of the second device; and performing the operation in operation S920 in a case that it is determined that the second device is not in the first decoding capability state.

In some embodiments, the determining a to-be-decoded sample in the target video according to the temporal layer information of the at least some samples in the target encapsulated file may include: selectively discarding some samples in the at least some samples according to the temporal layer information of the at least some samples in the target encapsulated file and the decoding capability information of the second device, and using remaining samples in the at least some samples as the to-be-decoded samples.

In some embodiments, the temporal layer information includes: an independent switching point identifier, used for indicating an independent switching point sample in samples in a video stream corresponding to a target track; and a description identifier, used for indicating a sample identity number within an effective range of the independent switching point sample. the selectively discarding some samples in the at least some samples according to the temporal layer information of the at least some samples in the target encapsulated file and the decoding capability information of the second device may include: obtaining the independent switching point sample in the at least some samples according to the independent switching point identifier in the target encapsulated file in a case that it is determined that the second device is in a second decoding capability state according to the decoding capability information of the second device; and selectively discarding samples within the effective range of the independent switching point sample and before the independent switching point sample according to the description identifier.

In some embodiments, the target encapsulated file includes a temporal layer number field and a temporal layer identifier, the temporal layer number field being used for indicating a temporal layer number in a video stream corresponding to a target track in the target video; and the temporal layer identifier being used for indicating temporal layers of samples in the video stream corresponding to the target track. the selectively discarding some samples in the at least some samples according to the temporal layer information of the at least some samples in the target encapsulated file and the decoding capability information of the second device may include: obtaining samples in a higher temporal layer in the at least some samples according to the temporal layer number field and the temporal layer identifier in the target encapsulated file in a case that it is determined that the second device is in a third decoding capability state according to the decoding capability information; and selectively discarding the samples in the higher temporal layer in the at least some samples.

Operation S930. Decode the to-be-decoded sample in a second device.

For another content in some embodiments, reference may be made to the content in the foregoing file encapsulation method embodiments and file transmission method embodiments.

How to decode the target video in a targeted manner is described below by using an example in which the user terminal determines a decoding capability of the user terminal according to a size of a device memory.

1. Similarly, it is assumed that a server encodes and encapsulates a video file A (a target video). It is assumed that there are three temporal layers $L_0$ to $L_2$ in the video file A, and video frames of the three temporal layers are divided into a total of six sample groups G1 to G6. Each field of a corresponding databox in a first encapsulated file of the target video is as follows.

--- temporal_layer_num=3 in Avs3DecoderConfigurationRecord;
G1: temporal_layer_id=0; same_layer_switch_flag=0; higher_layer_switch_flag=0;
G2: temporal_layer_id=1; same_layer_switch_flag=0; higher_layer_switch_flag=0;
G3: temporal_layer_id=1; same_layer_switch_flag=1; higher_layer_switch_flag=0; group_index_count=1; group_description_index=2;
G4: temporal_layer_id=2; same_layer_switch_flag=0; higher_layer_switch_flag=0;
G5: temporal_layer_id=1; same_layer_switch_flag=1; higher_layer_switch_flag=0; group_index_count=2; group_description_index=4.6;
G6: temporal_layer_id=2; same_layer_switch_flag=0; higher_layer_switch_flag=0.

---

2. The server respectively transmit the video file A to user terminals corresponding to a user 1, a user 2, and a user 3 according to client requests transmitted by second devices.

The server may directly transmit a first encapsulated file of the video file A to the user terminals corresponding to the user 1, the user 2, and the user 3, or the server may first transmit a first encapsulated file to one or more intermediate nodes, and the intermediate nodes may directly choose to forward the first encapsulated file or the second encapsulated file as a target encapsulated file to the user terminals corresponding to the user 1, the user 2, and the user 3 according to temporal layer information in the first encapsulated file and network statuses of the user terminals corresponding to the user 1, the user 2, and the user 3 during transmission.

3. The user terminals corresponding to the user 1, the user 2, and the user 3 respectively receive corresponding video files A and choose how to decode and consume the video file according to a use condition of the device memory of the user terminals:

It is assumed that the device memory of the user terminal corresponding to the user 1 is relatively large, that is, in a first decoding capability state, the video file A corresponding to the target encapsulated file may be directly decoded for presentation.

It is assumed that the device memory of the user terminal corresponding to the user 2 is relatively small, that is, in a second decoding capability state, because samples corresponding to the sample group G5 are independent switching point samples, and a corresponding effective range is G4 to G6, decoding of samples corresponding to the sample group G6 does not depend on samples corresponding to the sample group G4, and after the samples corresponding to the sample group G4 are discarded, the video file A is decoded for consumption.

It is assumed that the device memory of the user terminal corresponding to the user 3 is limited, that is, in a third decoding capability state, after all samples in the temporal layer $L_2$ may be directly discarded, the video file A is decoded for consumption.

How to selectively discard some samples may be determined according to an actual situation, but is not limited to the foregoing examples. If some samples are discarded within the effective range of the independent switching point sample, samples before the independent switching point sample may be discarded, and the independent switching point sample cannot be discarded. If samples belonging to a temporal layer are discarded, the independent switching point sample in the temporal layer may also be discarded.

In the foregoing examples, if all the samples in the temporal layer $L_2$ are discarded and some samples need to be continuously discarded, samples corresponding to the sample group G2 belonging to the temporal layer $L_1$ may also be selectively discarded.

It may be understood that how to evaluate the decoding capability information of the second device may be set according to an actual requirement, and herein a description is made by taking only the size of the device memory as an example, but this is not limited in the present disclosure. The comparison of the size of the device memory is relative.

The file encapsulation method, the file transmission method, and the file decoding method provided in the implementations of the present disclosure are applicable to video storage, transmission, encapsulation, and decapsulation processes.

Figure 10:
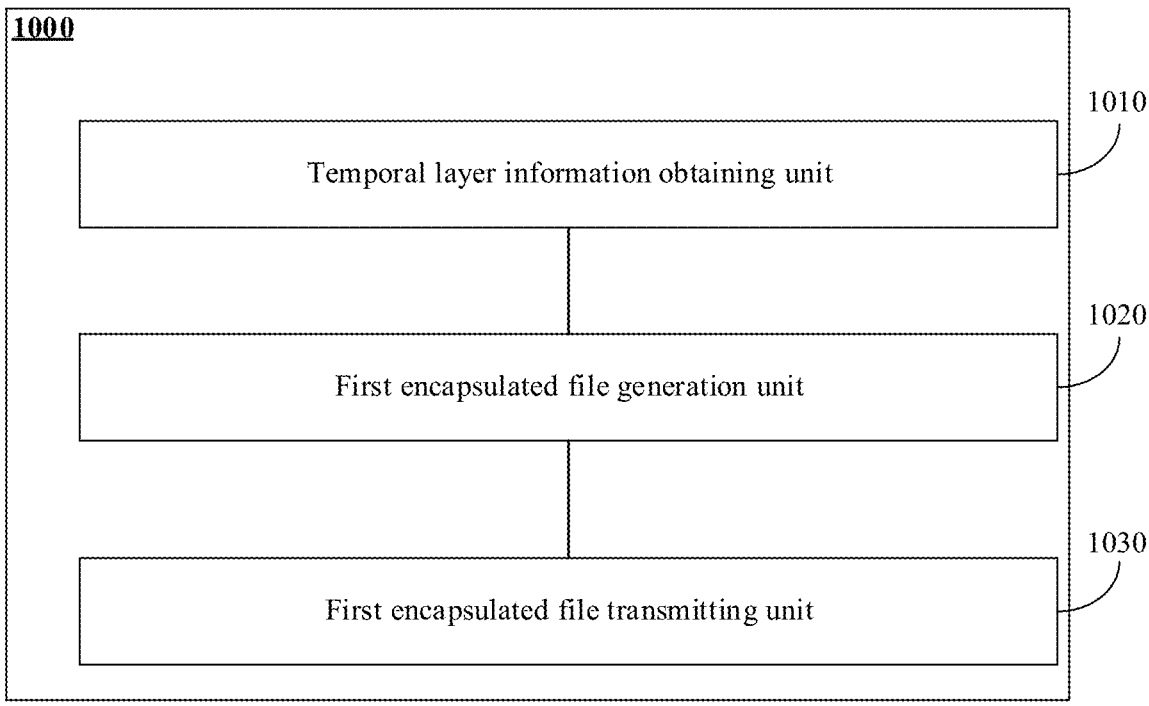
FIG. 10 schematically shows a block diagram of a file encapsulation apparatus according to some embodiments.

FIG. 10 schematically shows a block diagram of a file encapsulation apparatus according to some embodiments.

As shown in FIG. 10, the file encapsulation apparatus 1000 may include a temporal layer information obtaining unit 1010, a first encapsulated file generation unit 1020, and a first encapsulated file transmitting unit 1030.

In some embodiments, the temporal layer information obtaining unit 1010 may be configured to obtain an encoded target video and temporal layer information of samples determined during encoding of the target video, the target video including the samples. The first encapsulated file generation unit 1020 may be configured to encapsulate the encoded target video according to the temporal layer information of the samples, to generate a first encapsulated file, the first encapsulated file including the temporal layer information of the samples. The first encapsulated file transmitting unit 1030 may be configured to transmit the first encapsulated file to a first device.

According to the file encapsulation apparatus provided in some embodiments, temporal layer information corresponding to a target video is indicated in a first encapsulated file of the target video, on one hand, a first device for video transmission and consumption can more conveniently obtain the temporal layer information during network transmission and consumption without decoding an encoded bitstream of the target video, to save a large amount of computing resources. On the other hand, the first device can also obtain the temporal layer information of the target video in time even without an implementation capability of a decoding algorithm, so as to better guide transmission and decoding processes of the target video.

In some embodiments, the temporal layer information of the samples determined during encoding of the target video may include: a temporal layer number in a video stream corresponding to a target track in the target video and temporal layers of samples in the video stream corresponding to the target track. The first encapsulated file generation unit 1020 may include: a temporal layer number field adding unit, configured to add a temporal layer number field to the first encapsulated file, the temporal layer number field being used for indicating the temporal layer number in the video stream corresponding to the target track in the target video; and a temporal layer identifier adding unit, configured to add a temporal layer identifier to the first encapsulated file, the temporal layer identifier being used for indicating the temporal layers of the samples in the video stream corresponding to the target track, and a value of the temporal layer identifier in the first encapsulated file ranging from 0 to the temporal layer number minus 1.

In some embodiments, the temporal layer information of the samples determined during encoding of the target video may further include: an independent switching point sample in the samples in the video stream corresponding to the target track and an effective range of the independent switching point sample. The first encapsulated file generation unit 1020 may further include: an independent switching point identifier adding unit, configured to add an independent switching point identifier to the first encapsulated file, the independent switching point identifier being used for indicating the independent switching point sample in the samples in the video stream corresponding to the target track; and a description identifier adding unit, configured to add a description identifier to the first encapsulated file, the description identifier being used for indicating a sample identity number within the effective range of the independent switching point sample.

In some embodiments, the independent switching point identifier may include a same layer switching point identifier. The independent switching point identifier adding unit may include: a same layer switching point identifier setting unit, configured to set the same layer switching point identifier of the independent switching point sample to a first value in a case that a temporal layer identifier of the independent switching point sample is greater than 0 and the independent switching point sample and samples in a same temporal layer after the independent switching point sample do not depend on samples in a same temporal layer before the independent switching point sample during decoding.

In some embodiments, the independent switching point identifier may include a higher layer switching point identifier. The independent switching point identifier adding unit may further include: a higher layer switching point identifier setting unit, configured to set the higher layer switching point identifier of the independent switching point sample to the first value in a case that the temporal layer identifier of the independent switching point sample is greater than 0 and samples in a higher temporal layer after the independent switching point sample do not depend on samples in a same temporal layer or a higher temporal layer relative to the independent switching point sample before the independent switching point sample during decoding, in a case that the higher layer switching point identifier of the independent switching point sample is the first value, the same layer switching point identifier of the independent switching point sample being the first value.

In some embodiments, the first encapsulated file generation unit 1020 may further include: a quantity field adding unit, configured to add a quantity field to the first encapsulated file according to a quantity of samples within the effective range of the independent switching point sample.

For the specific implementations of the units in the file encapsulation apparatus provided in some embodiments, reference may be made to the content in the foregoing file encapsulation method, and details are not described herein again.

Figure 11:
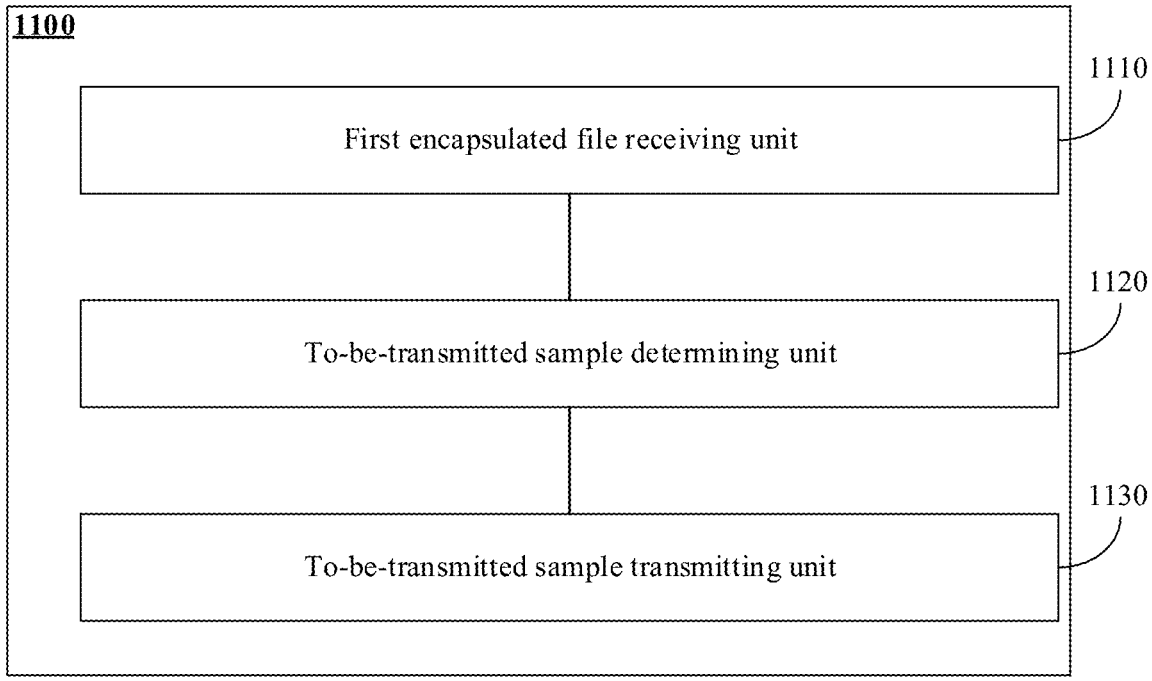
FIG. 11 schematically shows a block diagram of a file transmission apparatus according to some embodiments.

FIG. 11 schematically shows a block diagram of a file transmission apparatus according to some embodiments. As shown in FIG. 11, the file encapsulation apparatus 1100 in some embodiments may include a first encapsulated file receiving unit 1110, a to-be-transmitted sample determining unit 1120, and a to-be-transmitted sample transmitting unit 1130.

In some embodiments, the first encapsulated file receiving unit 1110 may be configured to receive a first encapsulated file, the first encapsulated file being generated by encapsulating an encoded target video according to temporal layer information of samples of the target video, the target video including the samples, the temporal layer information being determined during encoding of the target video, and the first encapsulated file including the temporal layer information of the samples. The to-be-transmitted sample determining unit 1120 may be configured to determine a to-be-transmitted sample in the target video according to the temporal layer information of the samples in the first encapsulated file. The to-be-transmitted sample transmitting unit 1130 may be configured to transmit the to-be-transmitted sample in the target video to a second device.

In some embodiments, the to-be-transmitted sample determining unit 1120 may include: a network status information obtaining unit, configured to obtain network status information of the second device; and a first encapsulated file direct transmitting unit, configured to transmit the first encapsulated file to the second device in a case that it is determined that the second device is in a first network state according to the network status information.

In some embodiments, the to-be-transmitted sample determining unit 1120 may further include: a partial sample discarding unit, configured to selectively discard some samples in the target video according to the temporal layer information of the samples in the first encapsulated file and the network status information of the second device; a re-encapsulation unit, configured to re-encapsulate the target video obtained after the some samples are selectively discarded, to generate a second encapsulated file; and a second encapsulated file transmitting unit, configured to transmit the second encapsulated file to the second device.

In some embodiments, the temporal layer information includes: an independent switching point identifier, used for indicating an independent switching point sample in samples in a video stream corresponding to a target track; and a description identifier, used for indicating a sample identity number within an effective range of the independent switching point sample. The partial sample discarding unit may include: an independent switching point sample obtaining unit, configured to obtain the independent switching point sample in the samples according to the independent switching point identifier in the samples in the first encapsulated file in a case that it is determined that the second device is in a second network state according to the network status information; and a sample selective discarding unit, configured to selectively discard samples within the effective range of the independent switching point sample and before the independent switching point sample according to the description identifier.

In some embodiment, the first encapsulated file includes a temporal layer number field and a temporal layer identifier, the temporal layer number field being used for indicating a temporal layer number in a video stream corresponding to a target track in the target video; and the temporal layer identifier being used for indicating temporal layers of samples in the video stream corresponding to the target track. The partial sample discarding unit may include: a higher temporal layer sample obtaining unit, configured to obtain samples in a higher temporal layer in the samples according to the temporal layer number field and the temporal layer identifier in the first encapsulated file in a case that it is determined that the second device is in a third network state according to the network status information; and a higher temporal layer sample discarding unit, configured to selectively discard the samples in the higher temporal layer in the samples.

For the specific implementations of the units in the file transmission apparatus provided in some embodiments, reference may be made to the content in the foregoing file transmission method, and details are not described herein again.

Figure 12:
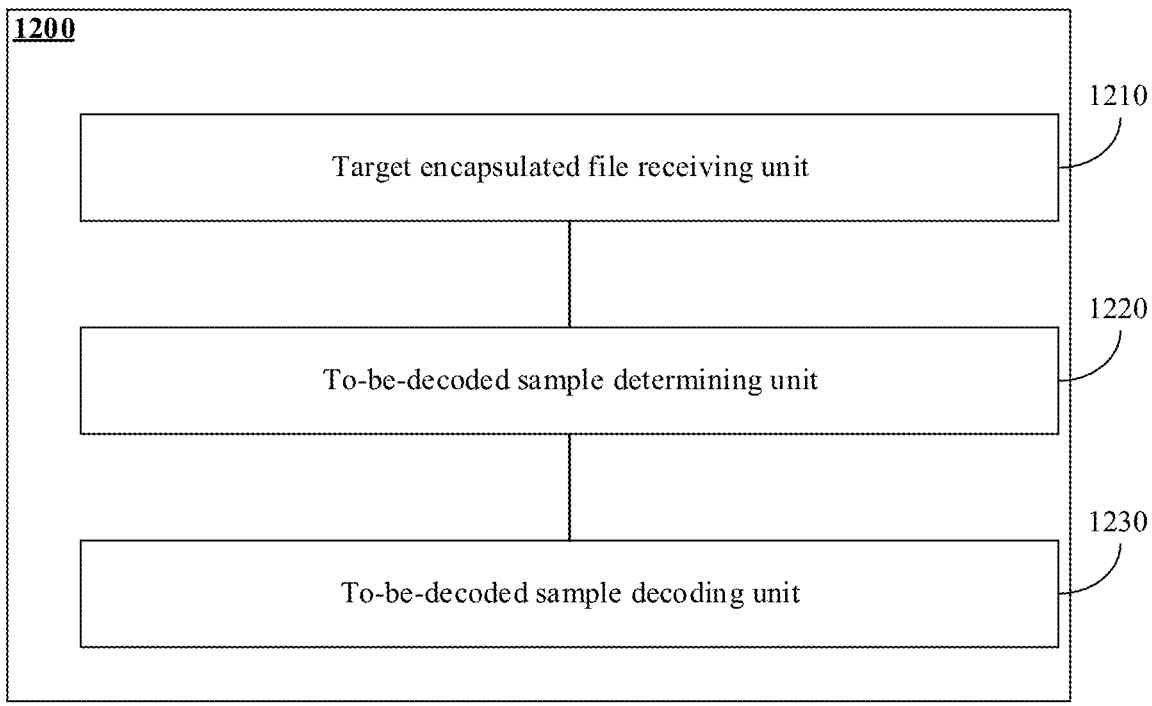
FIG. 12 schematically shows a block diagram of a file decoding apparatus according to some embodiments.

FIG. 12 schematically shows a block diagram of a file decoding apparatus according to some embodiments. As shown in FIG. 12, the file decoding apparatus 1200 in some embodiments may include a target encapsulated file receiving unit 1210, a to-be-decoded sample determining unit 1220, and a to-be-decoded sample decoding unit 1230.

In some embodiments, the target encapsulated file receiving unit 1210 may be configured to receive a target encapsulated file transmitted by a first device, the target encapsulated file being generated by encapsulating at least some samples in an encoded target video according to temporal layer information of samples in a target video, the temporal layer information being determined during encoding of the target video, and the target encapsulated file including temporal layer information of the at least some samples. The to-be-decoded sample determining unit 1220 may be configured to determine a to-be-decoded sample in the target video according to the temporal layer information of the at least some samples in the target encapsulated file. The to-be-decoded sample decoding unit 1230 may be configured to decode the to-be-decoded sample in a second device.

In some embodiments, the to-be-decoded sample determining unit 1220 may include: a decoding capability information obtaining unit, configured to obtain decoding capability information of the second device; and a direct decoding unit, configured to use the at least some samples as the to-be-decoded samples in a case that it is determined that the second device is in a first decoding capability state according to the decoding capability information of the second device.

In some embodiments, the to-be-decoded sample determining unit 1220 may further include: a remaining sample determining unit, configured to selectively discard some samples in the at least some samples according to the temporal layer information of the at least some samples in the target encapsulated file and the decoding capability information of the second device, and use remaining samples in the at least some samples as the to-be-decoded samples.

In some embodiments, the temporal layer information includes: an independent switching point identifier, used for indicating an independent switching point sample in samples in a video stream corresponding to a target track; and a description identifier, used for indicating a sample identity number within an effective range of the independent switching point sample. The remaining sample determining unit may include: an independent switching point sample determining unit, configured to obtain the independent switching point sample in the at least some samples according to the independent switching point identifier in the target encapsulated file in a case that it is determined that the second device is in a second decoding capability state according to the decoding capability information of the second device; and a sample before independent switching point sample discarding unit, configured to selectively discard samples within the effective range of the independent switching point sample and before the independent switching point sample according to the description identifier.

In some embodiments, the first encapsulated file includes a temporal layer number field and a temporal layer identifier, the temporal layer number field being used for indicating a temporal layer number in a video stream corresponding to a target track in the target video; and the temporal layer identifier being used for indicating temporal layers of samples in the video stream corresponding to the target track. The remaining sample determining unit may include: a higher temporal layer sample determining unit, configured to obtain samples in a higher temporal layer in the at least some samples according to the temporal layer number field and the temporal layer identifier in the target encapsulated file in a case that it is determined that the second device is in a third decoding capability state according to the decoding capability information; and a higher temporal layer sample discarding unit, configured to selectively discard the samples in the higher temporal layer in the at least some samples.

For the specific implementations of the units in the file decoding apparatus provided in some embodiments, reference may be made to the content in the foregoing file decoding method, and details are not described herein again.

Although a plurality of units of a device configured to perform actions are discussed in the foregoing detailed description, such division is not mandatory. In fact, according to the implementations of the present disclosure, the features and functions of two or more units described above may be embodied in one unit. On the contrary, the features and functions of one unit described above may be further divided into a plurality of units to be specified.

Some embodiments provide a computer-readable storage medium, storing a computer program, the program, when executed by a processor, implementing the file encapsulation method according to the foregoing embodiments.

Some embodiments provide a computer-readable storage medium, storing a computer program, the program, when executed by a processor, implementing the file transmission method according to the foregoing embodiments.

Some embodiments provide a computer-readable storage medium, storing a computer program, the program, when executed by a processor, implementing the file decoding method according to the foregoing embodiments.

Some embodiments provide an electronic device, including: at least one processor; and a storage apparatus, configured to store at least one program, the at least one program, when executed by the at least one processor, causing the at least one processor to implement the file encapsulation method according to the foregoing embodiments.

Some embodiments provide an electronic device, including: at least one processor; and a storage apparatus, configured to store at least one program, the at least one program, when executed by the at least one processor, causing the at least one processor to implement the file transmission method according to the foregoing embodiments.

Some embodiments provide an electronic device, including: at least one processor; and a storage apparatus, configured to store at least one program, the at least one program, when executed by the at least one processor, causing the at least one processor to implement the file decoding method according to the foregoing embodiments.

Figure 13:
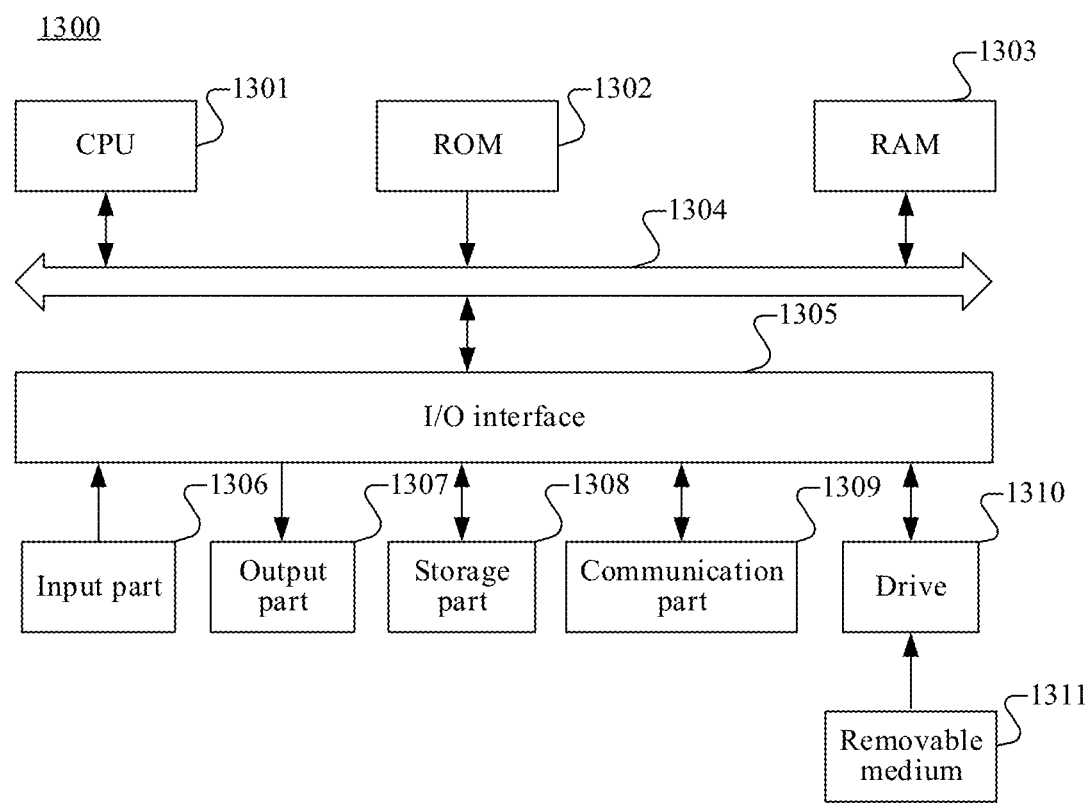
FIG. 13 is a schematic structural diagram of an electronic device adapted to implement the embodiments.

FIG. 13 is a schematic structural diagram of an electronic device adapted to implement some embodiments.

The electronic device 1300 shown in FIG. 13 is merely an example, and is not to impose any limitation on a function and use scope of the embodiments.

As shown in FIG. 13, the electronic device 1300 includes a central processing unit (CPU) 1301. The CPU can perform various proper actions and processing according to a program stored in a read-only memory (ROM) 1302 or a program loaded from a storage part 1308 into a random access memory (RAM) 1303. The RAM 1303 further stores various programs and data required for system operations. The CPU 1301, the ROM 1302, and the RAM 1303 are connected to each other by using a bus 1304. An input/output (I/O) interface 1305 is also connected to the bus 1304.

The following components are connected to the I/O interface 1305: an input part 1306 including a keyboard, a mouse, or the like; an output part 1307 including a cathode ray tube (CRT), a liquid crystal display (LCD), a speaker, or the like; a storage part 1308 including hard disk, etc.; and a communication part 1309 including a network interface card such as a local area network (LAN) card, a modem, or the like. The communication portion 1309 performs communication processing by using a network such as the Internet. A driver 1310 is also connected to the I/O interface 1305 as required. A removable medium 1311, such as a magnetic disk, an optical disc, a magneto-optical disk, or a semiconductor memory, is installed on the driver 1310 as required, so that a computer program read therefrom is installed into the storage part 1308 as required.

According to some embodiments, the processes described below by referring to the flowcharts may be implemented as computer software programs. For example, an embodiment of the present disclosure includes a computer program product, including a computer program carried on a computer-readable medium. The computer program includes program code for performing the method shown in the flowchart. In such an embodiment, by using the communication part 1309, the computer program may be downloaded and installed from a network, and/or installed from the removable medium 1311. When the computer program is executed by the CPU 1301, various functions defined in the methods and/or apparatuses are executed.

The computer-readable medium may be a computer-readable signal medium or a computer-readable storage medium or any combination thereof. The computer-readable storage medium may be, for example, but is not limited to, an electrical, magnetic, optical, electromagnetic, infrared, or semiconductor system, apparatus, or device, or any combination thereof. More specific examples of the computer-readable storage medium may include, but are not limited to, an electrical connection having at least one wire, a portable computer magnetic disk, a hard disk, a RAM, a ROM, an erasable programmable read-only memory (EPROM) (or flash memory), an optical fiber, a compact disk read-only memory (CD-ROM), an optical storage device, a magnetic storage device, or any appropriate combination thereof. In the present disclosure, the computer-readable storage medium may be any tangible medium including or storing a program, and the program may be used by or in combination with an instruction execution system, apparatus, or device. In the present disclosure, the computer-readable signal medium may include a data signal included in a baseband or propagated as a part of a carrier, the data signal carrying computer-readable program code. The data signal propagated in such a way may assume a plurality of forms, including, but not limited to, an electromagnetic signal, an optical signal, or any appropriate combination thereof. The computer-readable signal medium may alternatively be any computer-readable medium other than the computer-readable storage medium. The computer-readable medium may send, propagate, or transmit a program used by or in combination with an instruction execution system, apparatus, or device. The program code contained in the computer-readable storage medium may be transmitted by using any appropriate medium, including but not limited to: a wireless medium, a wire, an optical cable, a radio frequency (RF) medium, or any appropriate combination thereof.

The flowcharts and block diagrams in the accompanying drawings show architectures, functions, and operations that may be implemented by using the method, the apparatus, and the computer program product according to the embodiments of the present disclosure. In this regard, each box in the flowchart or the block diagram may represent a module, a program segment, or a part of code. The module, the program segment, or the part of code includes at least executable instruction used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram or a flowchart and a combination of boxes in the block diagram or the flowchart may be implemented by using a dedicated hardware-based system configured to perform a designated function or operation, or may be implemented by using a combination of dedicated hardware and a computer instruction.

Related units described in the embodiments may be implemented in a software manner, or may be implemented in a hardware manner, and the unit described can also be set in a processor. Names of the units do not constitute a limitation on the units in a specific case.

Some embodiments further provide a non-transitory computer-readable storage medium. The computer-readable storage medium may be included in the electronic device described in the above embodiments, or may exist alone without being assembled into the electronic device. The computer-readable storage medium carries one or more programs, the one or more programs, when executed by the electronic device, causing the electronic device to implement the method described in the following embodiments. For example, the electronic device may implement operations shown in FIG. 3, FIG. 4, FIG. 6, FIG. 8, or FIG. 9.

According to the foregoing descriptions of some embodiments, a person skilled in the art may readily understand that the exemplary implementations described herein may be implemented by using software, or may be implemented by combining software and necessary hardware. Therefore, the technical solutions according to the implementations of the present disclosure may be implemented in the form of a software product. The software product may be stored in a non-volatile storage medium (which may be a CD-ROM, a USB flash drive, a removable hard disk, or the like) or a network, and includes several instructions for instructing a computing device (which may be a personal computer, a server, a touch terminal, a network device, or the like) to perform the method according to the embodiments of the present disclosure.

After considering the specification and practicing the present disclosure, a person skilled in the art would easily conceive of other implementations of the present disclosure. The present disclosure is intended to cover any variation, use, or adaptive change, and. these variations, uses, or adaptive changes follow the general principles of the present disclosure and include common general knowledge or common technical means, which are not disclosed in the present disclosure, in the technology. The specification and the embodiments are considered as exemplary only, and a true scope and spirit of the present disclosure are pointed out by the following claims.

It is to be understood that the present disclosure is not limited to the precise structures described above and shown in the accompanying drawings, and various modifications and changes can be made without departing from the scope of the present disclosure. The scope of the present disclosure is limited only by the appended claims.

What is claimed is:

1. A file encapsulation method, performed by a computer device, comprising: obtaining an encoded target video and temporal layer information of samples determined during encoding of a target video, wherein temporal layer information of the samples determined during the encoding process of the target video comprises a number of temporal layers in the video stream corresponding to a target track in the target video, and the temporal layer of each sample in the video stream corresponding to the target track;

encapsulating the encoded target video according to the temporal layer information of the samples to generate a first encapsulated file, the first encapsulated file comprising the temporal layer information of the samples;

transmitting the first encapsulated file to a first device,
wherein encapsulating the encoded target video to generate the first encapsulated file comprises:
adding a temporal layer number field in the first encapsulated file, for indicating the number of temporal layers in the video stream corresponding to the target track in the target video;
adding a temporal layer identifier in the first encapsulated file, for indicating the temporal layer of each sample in the video stream corresponding to the target track; wherein the value range of the temporal layer identifier in the first encapsulated file is from zero to one less than the number of temporal layers: so that, after the first device receives the first encapsulated file, when the first device determines that a second device is in a third network state, the first device is configured to:
obtain the temporal layer identifier by decapsulating the first encapsulated file,
obtain the samples in higher temporal layers in the video stream corresponding to the target track according to the temporal layer identifier, selectively discard the samples in the higher temporal layers, and
re-encapsulate the video to generate a second encapsulated file.

2. The file encapsulation method according to claim 1, wherein
a value of the temporal layer identifier in the first encapsulated file ranges from 0 to the temporal layer number minus 1.

3. The file encapsulation method according to claim 2, wherein the temporal layer information of the samples determined during encoding of the target video further comprises: an independent switching point sample in the samples in the video stream corresponding to the target track and an effective range of the independent switching point sample; and
the encapsulating further comprises:
adding an independent switching point identifier to the first encapsulated file, the independent switching point identifier being used for indicating the independent switching point sample in the samples in the video stream corresponding to the target track; and
adding a description identifier to the first encapsulated file, the description identifier being used for indicating a sample identity number within the effective range of the independent switching point sample.

4. The file encapsulation method according to claim 3, wherein the independent switching point identifier comprises a same layer switching point identifier; and
the adding the independent switching point identifier to the first encapsulated file comprises:
setting the same layer switching point identifier of the independent switching point sample to a first value based on a temporal layer identifier of the independent switching point sample being greater than 0 and the independent switching point sample and samples in a same temporal layer after the independent switching point sample not depending on samples in a same temporal layer before the independent switching point sample during decoding.

5. The file encapsulation method according to claim 4, wherein the independent switching point identifier further comprises a higher layer switching point identifier; and
the adding the independent switching point identifier to the first encapsulated file further comprises:

setting the higher layer switching point identifier of the independent switching point sample to the first value based on the temporal layer identifier of the independent switching point sample being greater than 0 and samples in a higher temporal layer after the independent switching point sample not depending on samples in a same temporal layer or a higher temporal layer relative to the independent switching point sample before the independent switching point sample during decoding,
based on the higher layer switching point identifier of the independent switching point sample being the first value, the same layer switching point identifier of the independent switching point sample being the first value.

6. The file encapsulation method according to claim 3, wherein the encapsulating further comprises:
adding a quantity field to the first encapsulated file according to a quantity of samples within the effective range of the independent switching point sample.

7. A file encapsulation apparatus, comprising:
at least one memory configured to store program code; and
at least one processor configured to read the program code and operate as instructed by the program code, the program code comprising:
temporal layer information obtaining code configured to cause the at least one processor to obtain an encoded target video and temporal layer information of samples determined during encoding of a target video, wherein the temporal layer information of the samples determined during the encoding process of the target video comprises a number of temporal layers in the video stream corresponding to a target track in the target video, and the temporal layer of each sample in the video stream corresponding to the target track:
first encapsulated file generation code configured to cause the at least one processor to encapsulate the encoded target video according to the temporal layer information of the samples to generate a first encapsulated file, the first encapsulated file comprising the temporal layer information of the samples;
first encapsulated file transmitting code configured to cause the at least one processor to transmit the first encapsulated file to a first device,
wherein the first encapsulated file generation code further causes the at least one processor to generate the first encapsulated file by:
adding a temporal layer number field in the first encapsulated file, for indicating the number of temporal layers in the video stream corresponding to the target track in the target video;
adding a temporal layer identifier in the first encapsulated file, for indicating the temporal layer of each sample in the video stream corresponding to the target track;
wherein the value range of the temporal layer identifier in the first encapsulated file is from zero to one less than the number of temporal layers; so that, after the first device receives the first encapsulated file, when the first device determines that a second device is in a third network state, the first device is configured to:
obtain the temporal layer identifier by decapsulating the first encapsulated file,
obtain the samples in higher temporal layers in the video stream corresponding to the target track according to the temporal layer identifier, selectively discard the samples in the higher temporal layers, and re-encapsulate the video to generate a second encapsulated file.

8. The file encapsulation apparatus according to claim 7, wherein a value of the temporal layer identifier in the first encapsulated file ranging from 0 to the temporal layer number minus 1.

9. The file encapsulation apparatus according to claim 8, wherein a value of the temporal layer identifier in the first encapsulated file ranges from 0 to the temporal layer number minus 1.

10. The file encapsulation apparatus according to claim 9, wherein the temporal layer information of the samples determined during encoding of the target video further comprises: an independent switching point sample in the samples in the video stream corresponding to the target track and an effective range of the independent switching point sample; and the first encapsulated file generation code is further configured to cause the at least one processor to:

add an independent switching point identifier to the first encapsulated file, the independent switching point identifier being used for indicating the independent switching point sample in the samples in the video stream corresponding to the target track; and add a description identifier to the first encapsulated file, the description identifier being used for indicating a sample identity number within the effective range of the independent switching point sample.

11. The file encapsulation apparatus according to claim 10, wherein the independent switching point identifier comprises a same layer switching point identifier; and the first encapsulated file generation code is further configured to cause the at least one processor to:

set the same layer switching point identifier of the independent switching point sample to a first value, based on a temporal layer identifier of the independent switching point sample being greater than 0 and the independent switching point sample and samples in a same temporal layer after the independent switching point sample not depending on samples in a same temporal layer before the independent switching point sample during decoding.

12. The file encapsulation apparatus according to claim 11, wherein the independent switching point identifier further comprises a higher layer switching point identifier; and the first encapsulated file generation code is further configured to cause the at least one processor to:

set the higher layer switching point identifier of the independent switching point sample to the first value based on the temporal layer identifier of the independent switching point sample being greater than 0 and samples in a higher temporal layer after the independent switching point sample not depending on samples in a same temporal layer or a higher temporal layer relative to the independent switching point sample before the independent switching point sample during decoding, based on the higher layer switching point identifier of the independent switching point sample being the first value, the same layer switching point identifier of the independent switching point sample being the first value.

13. The file encapsulation apparatus according to claim 10, wherein the first encapsulated file generation code is further configured to cause the at least one processor to:

add a quantity field to the first encapsulated file according to a quantity of samples within the effective range of the independent switching point sample.

14. A non-transitory computer-readable storage medium, storing computer code that when executed by at least one processor causes the at least one processor to obtain an encoded target video and temporal layer information of samples determined during encoding of a target video, wherein the temporal layer information of the samples determined during the encoding process of the target video comprises a number of temporal layers in the video stream corresponding to a target track in the target video, and the temporal layer of each sample in the video stream corresponding to the target track;

encapsulate the encoded target video according to the temporal layer information of the samples to generate a first encapsulated file, the first encapsulated file comprising the temporal layer information of the samples;

transmit the first encapsulated file to a first device, wherein encapsulating the encoded target video to generate the first encapsulated file comprises:

adding a temporal layer number field in the first encapsulated file, for indicating the number of temporal layers in the video stream corresponding to the target track in the target video;

adding a temporal layer identifier in the first encapsulated file, for indicating the temporal layer of each sample in the video stream corresponding to the target track;

wherein the value range of the temporal layer identifier in the first encapsulated file is from zero to one less than the number of temporal layers; so that, after the first device receives the first encapsulated file, when the first device determines that a second device is in a third network state, the first device is configured to:

obtain the temporal layer identifier by decapsulating the first encapsulated file, obtain the samples in higher temporal layers in the video stream corresponding to the target track according to the temporal layer identifier, selectively discard the samples in the higher temporal layers, and re-encapsulate the video to generate a second encapsulated file.

15. The non-transitory computer-readable storage medium according to claim 14, wherein a value of the temporal layer identifier in the first encapsulated file ranges from 0 to the temporal layer number minus 1.

16. The non-transitory computer-readable storage medium according to claim 15, wherein the temporal layer information of the samples determined during encoding of the target video further comprises: an independent switching point sample in the samples in the video stream corresponding to the target track and an effective range of the independent switching point sample; and wherein encapsulation of the encoded target video further comprises:

adding an independent switching point identifier to the first encapsulated file, the independent switching point identifier being used for indicating the independent switching point sample in the samples in the video stream corresponding to the target track; and adding a description identifier to the first encapsulated file, the description identifier being used for indicating a sample identity number within the effective range of the independent switching point sample.

17. The non-transitory computer-readable storage medium according to claim 16, wherein the independent switching point identifier comprises a same layer switching point identifier; and the adding the independent switching point identifier to the first encapsulated file comprises:

setting the same layer switching point identifier of the independent switching point sample to a first value based on a temporal layer identifier of the independent switching point sample being greater than 0 and the independent switching point sample and samples in a same temporal layer after the independent switching point sample not depending on samples in a same temporal layer before the independent switching point sample during decoding.

18. The non-transitory computer-readable storage medium according to claim 17, wherein the independent switching point identifier further comprises a higher layer switching point identifier; and the adding the independent switching point identifier to the first encapsulated file further comprises:

setting the higher layer switching point identifier of the independent switching point sample to the first value based on the temporal layer identifier of the independent switching point sample being greater than 0 and samples in a higher temporal layer after the independent switching point sample not depending depend on samples in a same temporal layer or a higher temporal layer relative to the independent switching point sample before the independent switching point sample during decoding, based on the higher layer switching point identifier of the independent switching point sample being the first value, the same layer switching point identifier of the independent switching point sample being the first value.

19. The non-transitory computer-readable storage medium according to claim 16, wherein the encapsulate further comprises:

adding a quantity field to the first encapsulated file according to a quantity of samples within the effective range of the independent switching point sample.

* * * * *